US010481256B2

(12) United States Patent
Jones et al.

(10) Patent No.: US 10,481,256 B2
(45) Date of Patent: Nov. 19, 2019

(54) SHOPPING CART CORRAL SYSTEM AND ASSOCIATED SYSTEMS AND METHODS

(71) Applicant: Walmart Apollo, LLC, Bentonville, AR (US)

(72) Inventors: Nicholaus Adam Jones, Fayetteville, AR (US); Robert James Taylor, Rogers, AR (US); Aaron James Vasgaard, Rogers, AR (US); Matthew Allen Jones, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 288 days.

(21) Appl. No.: 15/479,658

(22) Filed: Apr. 5, 2017

(65) Prior Publication Data

US 2017/0293026 A1 Oct. 12, 2017

Related U.S. Application Data

(60) Provisional application No. 62/318,886, filed on Apr. 6, 2016.

(51) Int. Cl.
*G01S 13/88* (2006.01)
*A47F 10/04* (2006.01)
(Continued)

(52) U.S. Cl.
CPC .............. *G01S 13/88* (2013.01); *A47F 10/04* (2013.01); *G01S 13/04* (2013.01); *B62B 3/14* (2013.01); *B62B 5/0096* (2013.01); *G08B 13/24* (2013.01)

(58) Field of Classification Search
CPC .. G08B 13/2402; G08B 13/2462; G07C 9/00; B62B 5/0096; B62B 3/14; A47F 10/04; G01S 13/04; G01S 13/74; G01S 13/88
See application file for complete search history.

(56) References Cited

U.S. PATENT DOCUMENTS 3,938,638 A * 2/1976 Moule ..................... A47F 10/04
194/211
4,470,495 A * 9/1984 Unger ................... G07F 7/0627
194/205
(Continued)

FOREIGN PATENT DOCUMENTS

CA 2896121 A1 9/2006
WO WO1985000961 A1 3/1985

OTHER PUBLICATIONS

AeroCodic: Baggage Trolley Dispensing System, Dossier, Corporacion Mercanta S.L. (2003).
(Continued)

*Primary Examiner* — Peter M Bythrow
(74) *Attorney, Agent, or Firm* — McCarter & English, LLP; David R. Burns

(57) ABSTRACT

Example shopping cart corral systems and associated systems and methods are described. The example shopping cart corral system includes a corral structure, a radio-frequency transmitter, a radio-frequency receiver, and a controller coupled to the radio-frequency transmitter and the radio-frequency receiver. The controller estimates a quantity of shopping carts disposed in the shopping cart corral based on at least one property of the reflected radio-frequency signal. An example shopping cart counter system includes an elongated structure, first and second electrical contacts, a power source and a processing device. The power source applies a voltage or an electrical current to the first electrical contact and the shopping carts complete an electrical circuit between the first and second electrical contacts. The processing device estimates the quantity of shopping carts disposed in the elongated structure based on an electrical resistance associated with the shopping carts.

20 Claims, 18 Drawing Sheets

(51) Int. Cl.
*G01S 13/04* (2006.01)
*B62B 5/00* (2006.01)
*G08B 13/24* (2006.01)
*B62B 3/14* (2006.01)

(56) References Cited

U.S. PATENT DOCUMENTS

| | | | | |
|---|---|---|---|---|
| 5,119,087 A | * | 6/1992 | Lucas | G07F 7/0636 |
| | | | | 194/211 |
| 5,402,106 A | * | 3/1995 | DiPaolo | B62B 3/1404 |
| | | | | 340/426.28 |
| 6,024,203 A | * | 2/2000 | Amdahl | A47F 10/04 |
| | | | | 194/213 |
| 6,125,985 A | | 10/2000 | Amdahl et al. | |
| 6,206,165 B1 | * | 3/2001 | Lenander | A47F 10/04 |
| | | | | 194/213 |
| 6,378,684 B1 | * | 4/2002 | Cox | G07F 7/0636 |
| | | | | 194/213 |
| 6,480,699 B1 | | 11/2002 | Lovoi | |
| 6,486,768 B1 | * | 11/2002 | French | G06Q 30/0222 |
| | | | | 194/211 |
| 6,894,614 B2 | * | 5/2005 | Eckstein | G08B 13/2414 |
| | | | | 340/505 |
| 6,911,908 B1 | * | 6/2005 | Beart | G06Q 10/087 |
| | | | | 186/62 |
| 6,975,205 B1 | | 12/2005 | French et al. | |
| 7,218,225 B2 | * | 5/2007 | Wieth | G07F 7/0636 |
| | | | | 186/62 |
| 7,292,158 B2 | * | 11/2007 | Wieth | A47F 9/045 |
| | | | | 186/59 |
| 7,944,368 B2 | * | 5/2011 | Carter | B60T 7/16 |
| | | | | 340/426.11 |
| 8,314,690 B2 | * | 11/2012 | Sonnendorfer | B62B 5/0423 |
| | | | | 188/1.12 |
| 8,433,507 B2 | * | 4/2013 | Hannah | A47F 10/04 |
| | | | | 701/400 |
| 8,473,192 B2 | * | 6/2013 | Hannah | A47F 10/04 |
| | | | | 701/408 |
| 2002/0121977 A1 | * | 9/2002 | Wieth | A47F 9/045 |
| | | | | 340/571 |
| 2002/0121978 A1 | * | 9/2002 | Wieth | A47F 9/045 |
| | | | | 340/571 |
| 2006/0244588 A1 | * | 11/2006 | Hannah | A47F 10/04 |
| | | | | 340/539.13 |
| 2006/0247847 A1 | * | 11/2006 | Carter | A47F 10/04 |
| | | | | 701/498 |
| 2007/0225879 A1 | * | 9/2007 | French | G06Q 10/087 |
| | | | | 701/23 |
| 2008/0074260 A1 | * | 3/2008 | Reiner | B60R 25/09 |
| | | | | 340/568.5 |
| 2008/0315540 A1 | * | 12/2008 | Hannah | A47F 10/04 |
| | | | | 280/33.994 |
| 2008/0316029 A1 | * | 12/2008 | Hannah | A47F 10/04 |
| | | | | 340/568.5 |
| 2008/0316059 A1 | * | 12/2008 | Hannah | A47F 10/04 |
| | | | | 340/988 |
| 2011/0030875 A1 | * | 2/2011 | Conte | G01V 15/00 |
| | | | | 156/64 |
| 2012/0062393 A1 | * | 3/2012 | Desiderio | G01S 7/003 |
| | | | | 340/932.2 |
| 2013/0187755 A1 | * | 7/2013 | Rogers | G06Q 30/06 |
| | | | | 340/5.61 |
| 2017/0185950 A1 | * | 6/2017 | Roet | G06Q 10/087 |

OTHER PUBLICATIONS

Durban, J., A study of available technologies addressing Asset tracking and localization, RFID Technology, Vorelco (Nov. 23, 2008).

* cited by examiner

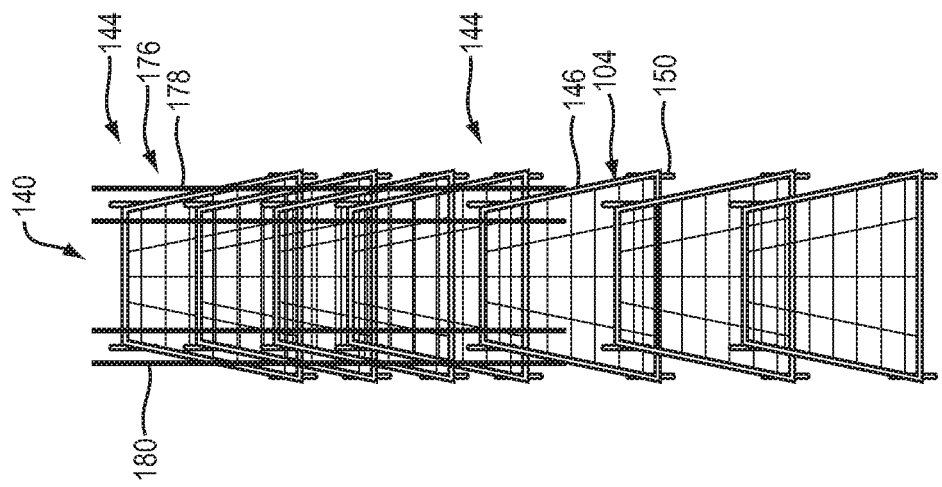
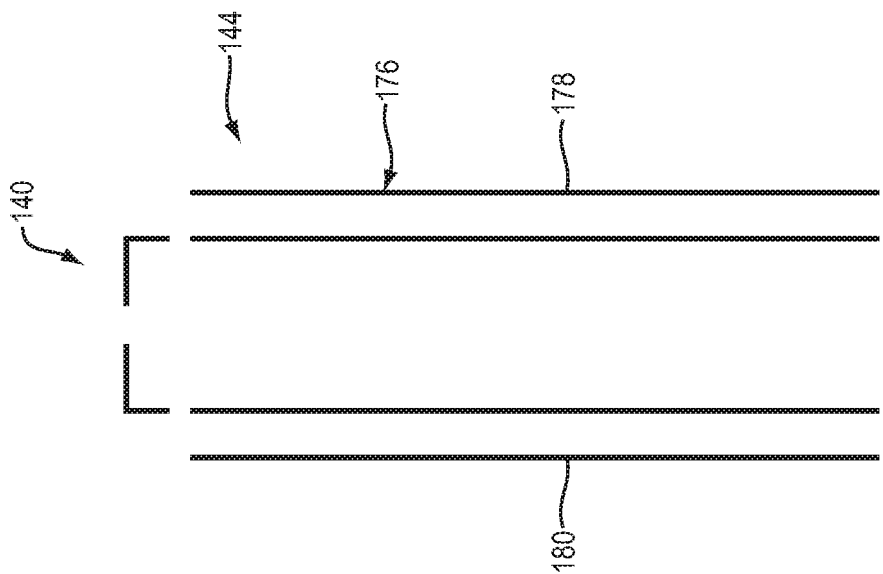

SHOPPING CART CORRAL SYSTEM AND ASSOCIATED SYSTEMS AND METHODS

CROSS-REFERENCE TO RELATED APPLICATIONS

This application claims the benefit of commonly assigned U.S. Provisional Patent Application No. 62/318,886, which was filed on Apr. 6, 2016. The entire content of the foregoing provisional patent application is incorporated herein by reference.

BACKGROUND

Properly staffing a retail environment increases customer satisfaction, resulting in a positive experience for the customer at the retail environment. Determining how to properly staff the retail environment (and/or specific areas of the retail environment) can be difficult to accomplish without knowing potential customer traffic. Generally, sales data is used by retail environments to estimate customer traffic during different periods of time. However, sales data alone can be insufficient for accurately estimating customer traffic, and can result in lengthy customer queue times at point-of-sale terminals and/or insufficient staffing throughout the retail environment, which leads to a negative experience for customers.

SUMMARY

Exemplary embodiments of the present disclosure provide a shopping cart corral system and associated systems and methods that allow for an accurate and efficient estimation of customer traffic within a retail environment. In particular, based on an estimated shopping cart count within a shopping cart corral or enclosure, the number of customers within the retail environment can be estimated. Based on the customer traffic within the retail environment over various periods of time, staffing can be adjusted to meet the needs of customers visiting the retail environment.

In accordance with embodiments of the present disclosure, an exemplary shopping cart corral system is provided that includes a corral structure, a radio-frequency (RF) transmitter, an RF receiver, and a controller. The corral structure can include a proximal end, a distal end, and an enclosure configured and dimensioned to extend between the proximal and distal ends. The proximal end of the corral structure can include an opening for entrance and exit of the one or more shopping carts from the enclosure.

The RF transmitter can be configured to transmit an RF signal into the interior area of the enclosure. The RF signal can interact with the one or more shopping carts in the corral structure to generate a reflected RF signal having at least one property that differs from the RF signal. The RF receiver can be configured to receive the reflected RF signal. The controller can be operatively coupled to the RF receiver. The controller can be configured to estimate a quantity of shopping carts that are disposed in the interior area of the enclosure based on the at least one property of the reflected RF signal received by the RF receiver.

In some embodiments, the RF transmitter can be disposed at the distal end of the corral structure. The RF transmitter can transmit the RF signal from the distal end towards the proximal end of the corral structure. In some embodiments, the RF transmitter can transmit a plurality of RF signals into the interior area of the enclosure and the RF receiver can receive a plurality of reflected RF signals. The reflected signal can be a radiated wave reflection.

The one or more shopping carts in the corral structure interfere with the RF signal. A degree to which the one or more shopping carts interfere with the RF signal can increase as a number of shopping carts disposed within the interior area of the enclosure increases. The controller can be configured to determine that zero shopping carts are in the interior area of the enclosure of the corral structure in response to a first value of the at least one property of the reflected RF signal. The controller can be configured to determine that half of the interior area of the enclosure of the corral structure is filled with the one or more shopping carts in response to a second value of the at least one property of the reflected RF signal. The controller can be configured to determine that three-quarters of the interior area of the enclosure of the corral structure is filled with the one or more shopping carts based on a third value of the at least one property of the reflected RF signal.

In accordance with embodiments of the present disclosure, an exemplary method of estimating a customer count is provided. The method includes providing a shopping cart corral system. The shopping cart corral system includes a corral structure, an RF transmitter, an RF receiver, and a controller. The corral structure can include a proximal end, a distal end and an enclosure configured and dimensioned to extend between the proximal and distal end. The enclosure can define an interior area for receiving one or more shopping carts. The proximal end of the corral structure can include an opening for entrance and exit of the one or more shopping carts from the enclosure. The controller can be operatively coupled to the RF receiver.

The method includes transmitting an RF signal with the RF transmitter into the interior area of the enclosure. The RF signal can interact with the one or more shopping carts in the corral structure to generate a reflected RF signal having at least one property that differs from the RF signal. The method includes receiving the reflected RF signal with the RF receiver. The method includes estimating a quantity of shopping carts that are disposed in the interior area of the enclosure with the controller based on the at least one property of the reflected RF signal received by the RF receiver. The method can include estimating a customer count within a retail environment based on the estimated quantity of shopping carts that are disposed in the interior area of the enclosure. The method further includes transmitting the RF signal with the RF transmitter from the distal end towards the proximal end of the corral structure.

In accordance with embodiments of the present disclosure, an exemplary customer count estimation system is provided. The system includes a corral structure, a first RF transmitter, a first RF receiver, a second RF transmitter, a second RF receiver, and a controller. The corral structure can include a proximal end, a distal end and an enclosure configured and dimensioned to extend between the proximal and distal ends. The enclosure defines an interior area for receiving one or more shopping carts. The proximal end of the corral structure can include an opening for entrance and exit of the one or more shopping carts from the enclosure.

The first RF transmitter can transmit a first RF signal into the interior area of the enclosure. The first RF signal can interact with the one or more shopping carts in the corral structure to generate a first reflected RF signal having at least one property that differs from the first RF signal. The first RF receiver can be configured to receive the first reflected RF signal. The second RF transmitter can be disposed at an entrance of a retail environment to transit a second RF signal into (and/or across) the entrance of the retail environment. The second RF signal can interact with one or more shopping carts passing through the entrance of the retail environment to generate a second reflected RF signal having at least one property that differs from the second RF signal. The second RF receiver can be configured to receive the second reflected RF signal.

The controller can be operatively coupled to the first RF receiver and the second RF receiver. The controller can be configured to estimate a quantity of shopping carts that are disposed in the interior area of the enclosure based on the at least one property of the reflected first RF signal received by the first RF receiver. The controller can be configured to estimate a quantity of shopping carts that are disposed within the retail environment based on the at least one property of the reflected second RF signal received by the second RF receiver. The controller can be configured to estimate a customer count within the retail environment based on the quantity of shopping carts that are disposed in the interior area of the enclosure and the quantity of shopping carts that are disposed within the retail environment. In some embodiments, the first RF transmitter can transmit the first RF signal from the distal end towards the proximal end of the corral structure. In some embodiments, the second RF transmitter can transmit the second RF signal across the entrance of the retail environment.

In accordance with embodiments of the present disclosure, an exemplary shopping cart counter system is provided. The system can include an elongated structure, a first electrical contact, a second electrical contact, a power source, and a processing device. The elongated structure can be configured and dimensioned with an interior area for receiving one or more shopping carts. The interior area can have a length measured between a proximal end and a distal end of the elongated structure, and a width measured between a first side and a second side of the elongated structure.

The first electrical contact can be disposed on the first or second side of the elongated structure. The second electrical contact can be disposed on the first or second side of the elongated structure. In particular, the first and second electrical contacts can be disposed on opposing sides of the elongated structure. The power source can be configured to apply a voltage or an electrical current to the first electrical contact. In response to the one or more shopping carts being disposed in the interior area of the elongated structure, the one or more shopping carts can complete an electrical circuit between the first and second electrical contacts. The processing device can be configured to estimate a quantity of the one or more shopping carts disposed within the interior area of the elongated structure based on an electrical resistance associated with the one or more shopping carts.

In some embodiments, the first electrical contact can be disposed on the first side of the structure and the second electrical contact can be disposed on the second side of the structure such that the first and second electrical contacts are disposed on opposite sides of the structure. The first electrical contact can include a first wire brush and the second electrical contact can include a second wire brush. The first wire brush can be configured and dimensioned to contact a first side of the one or more shopping carts. The second wire brush can be configured and dimensioned to contact with a second side of the one or more shopping carts.

The elongated structure can include a track including a first track path configured and dimensioned to receive a right side wheel of the shopping cart, and a second track path configured and dimensioned to receive a left side wheel of the shopping cart. The first track path can include the first electrical contact, and the second track path can include the second electrical contact. Contact between the right side wheel with the first track path and contact between the left side wheel with the second track path creates an electrical connection between the shopping cart and the elongated structure. The electrical resistance of the one or more shopping carts can be measured based on a voltage drop across the one or more shopping carts and an electrical current flowing through the one or more shopping carts. In response to zero shopping carts being disposed in the interior area of the elongated structure, the first and second electrical contacts can be electrically isolated from each other.

In accordance with embodiments of the present disclosure, an exemplary method of counting shopping carts is provided. The method includes providing a shopping cart counter system that includes an elongated structure, a first electrical contact, a second electrical contact, a power source, and a processing device. The elongated structure can be configured and dimensioned with an interior area for receiving one or more shopping carts. The interior area can have a length measured between a proximal end and a distal end of the elongated structure, and a width measured between a first side and a second side of the elongated structure. The first electrical contact can be disposed on the first or second side of the elongated structure. The second electrical contact can be disposed on the first or second side of the elongated structure.

The method includes applying a voltage or an electrical current to the first electrical contact with the power source. In response to the one or more shopping carts being disposed in the interior area, the one or more shopping carts can complete an electrical circuit between the first and second electrical contacts. The method includes estimating a quantity of the one or more shopping carts disposed within the interior area with the processing device based on an electrical resistance associated with the one or more shopping carts.

The method includes creating an electrical contact between a first side of the one or more shopping carts and the first electrical contact. The method includes creating an electrical contact between a second side of the one or more shopping carts and the second electrical contact. The voltage or electrical current can be transmitted by the power source across the width of the interior area. The method can include providing a shopping cart counter at an entrance of a retail environment. The shopping cart counter can estimate an entrance shopping cart count based on one or more shopping carts entering the retail environments through the entrance. The method can include estimating a retail shopping cart count with the processing device based on a difference between the entrance shopping cart count and the quantity of the one or more shopping carts disposed within the interior area of the elongated structure. The method can include estimating a customer count within the retail environment with the processing device based on the retail shopping cart count.

In accordance with embodiments of the present disclosure, an exemplary customer count estimation system is provided. The system includes a shopping cart counter system, a shopping cart counter, and a processing device. The shopping cart counter system includes an elongated structure, a first electrical contact, a second electrical contact, and a power source. The elongated structure can be configured and dimensioned with an interior area for receiving one or more shopping carts. The interior area can have a length measured between a proximal end and a distal end of the elongated structure, and a width measured between a first side and a second side of the elongated structure. The first electrical contact can be disposed on the first or second side of the elongated structure. The second electrical contact can be disposed on the first or second side of the elongated structure. The power source can be configured to apply a voltage or an electrical current to the first electrical contact. In response to the one or more shopping carts being disposed din the interior area, the one or more shopping carts can complete an electrical circuit between the first and second electrical contacts.

The shopping cart counter can be disposed at an entrance of a retail environment. The processing device can be configure to estimate a quantity of the one or more shopping carts disposed within the interior area based on an electrical resistance associated with the one or more shopping carts. The processing device can be configured to estimate an entrance shopping cart count based on one or more shopping carts entering the retail environment through the entrance. The processing device can be configured to estimate a retail shopping cart count based on a difference between the entrance shopping cart count and the quantity of the one or more shopping carts disposed within the interior area. The processing device can be configured to estimate a customer count within the retail environment based on the retail shopping cart count. In some embodiments, the system can include a transmission system configured to transmit and receive data between the shopping cart counter system, the shopping cart counter, and the processing device.

In accordance with embodiments of the present disclosure, an exemplary method of estimating a customer count in a retail environment is provided. The method includes providing a first shopping cart detector disposed at a shopping cart corral. The method includes determining a first shopping cart count with the first shopping cart detector. The first shopping cart count can represent a number of shopping carts within the shopping cart corral. The method includes determining a second shopping cart count with a second shopping cart detector. The second shopping cart count can represent a number of shopping carts entering the retail environment through an entrance. The method includes determining a difference between the second shopping cart count and the first shopping cart count with a processing device. The difference can represent a retail environment shopping cart count. The method includes estimating a customer count within the retail environment with the processing device based on the retail environment shopping cart count.

In some embodiments, the shopping cart corral can be disposed inside of the retail environment. In some embodiments, the shopping cart corral can be disposed outside of the retail environment. In some embodiments, determining the first shopping cart count with the first shopping cart detector can include implementing a mechanical counter to count the number of shopping carts entering and exiting the shopping cart corral. In some embodiments, determining the first shopping cart count with the first shopping cart detector can include transmitting an RF signal with an RF transmitter into an interior area of the shopping cart corral to generate a reflected RF signal having at least one property that differs from the RF signal, receiving with an RF receiving the reflected RF signal, and estimating the first shopping cart count based on the at least one property of the reflected RF signal received by the RF receiver.

In some embodiments, determining the first shopping cart count with the first shopping cart detector can include applying a voltage or an electrical current to a first electrical contact. In response to the one or more shopping carts being disposed in the interior area, the one or more shopping carts can complete an electrical circuit between the first and second electrical contacts, and the method includes estimating the first shopping cart count based on an electrical resistance associated with the one or more shopping carts.

In some embodiments, determining the second shopping cart count with the second shopping cart detector can include implementing a mechanical counter to count the number of shopping carts entering and exiting the retail environment through the entrance. In some embodiments, determining the second shopping cart count with the second shopping cart detector can include transmitting a second RF signal into (and/or across) the entrance of the retail environment. The second RF signal can interact with one or more shopping carts passing through the entrance of the retail environment to generate a second reflected RF signal having at least one property that differs from the second RF signal. The method can include receiving the second reflected RF signal at a second RF receiver. The method can include estimating the second shopping cart count based on the at least one property of the reflected second RF signal received by the second RF receiver.

The method can include storing data corresponding to the first shopping cart count, the second shopping cart count, and the customer count in a database. The data can correspond to different days and times of day. The method can include analyzing the data stored in the database with the processing device to identify the days and the times of day corresponding to peak customer counts. The method can include forecasting employee scheduling based on the peak customer counts. In particular, forecasting employee scheduling allows the retail environment to appropriately staff the retail environment (and/or specific areas of the retail environment) during forecast peak customer counts, ensuring a positive experience for customers.

In accordance with embodiments of the present disclosure, an exemplary non-transitory computer-readable medium is provided that stores instructions that are executable by a processing device. Execution of the instructions by the processing device causes the processing device to determine a first shopping cart count with a first shopping cart detector at a shopping cart corral. The first shopping cart count can represent a number of shopping carts within the shopping cart corral. Execution of the instructions by the processing device can cause the processing device to determine a second shopping cart count with a second shopping cart detector. The second shopping cart count can represent a number of shopping carts entering the retail environment through an entrance. Execution of the instructions by the processing device can cause the processing device to determine a difference between the second shopping cart count and the first shopping cart count with the processing device. The difference can represent a retail environment shopping cart count. Execution of the instructions by the processing device can cause the processing device to estimate a customer count within the retail environment with the processing device based on the retail environment shopping cart count.

In some embodiments, execution of the instructions by the processing device can cause the processing device to transmit an RF signal with an RF transmitter into an interior area of the shopping cart corral to generate a reflected RF signal having at least one property that differs from the transmitted RF signal, receive with the RF receiver the reflected RF signal, and estimate the first shopping cart count based on the at least one property of the reflected RF signal received by the RF receiver. In some embodiments, execution of the instructions by the processing device can cause the processing device to apply a voltage or an electrical current to a first electrical contact to a second electrical contact of an interior of the shopping cart corral. In response to the one or more shopping carts being disposed in the interior area, the one or more shopping carts can complete an electrical circuit between the first and second electrical contacts, and the processing device can estimate the first shopping cart count based on an electrical resistance associated with the one or more shopping carts.

In some embodiments, execution of the instructions by the processing device can cause the processing device to transmit a second RF signal into the entrance of the retail environment. The second RF signal can interact with one or more shopping carts passing through the entrance of the retail environment to generate a second reflected RF signal having at least one property that differs from the second RF signal. The processing device can receive the second reflected RF signal at a second RF receiver, and estimates the second shopping cart count based on the at least one property of the reflected second RF signal received by the second RF receiver. Execution of the instructions by the processing device can cause the processing device to store data corresponding to the first shopping cart count, the second shopping cart count, and the customer count in a database. The data can correspond to different days and times. Execution of the instructions by the processing device can cause the processing device to analyze the data stored in the database to identify the days and times of day corresponding to peak customer counts, and forecast employee scheduling based on the peak customer counts.

In accordance with embodiments of the present disclosure, an exemplary system of scheduling employees in a retail environment is provided. The system can include a first shopping cart detector, a second shopping cart detector, and a processing device. The first shopping cart detector can be disposed at a shopping cart corral. The second shopping cart detector can be disposed at an entrance of a retail environment. The processing device can be configured to determine a first shopping cart count with the first shopping cart detector. The first shopping cart count can represent a number of shopping carts within the shopping cart corral. The processing device can be configured to determine a second shopping cart count with the second shopping cart detector. The second shopping cart count can represent a number of shopping carts entering the retail environment through an entrance. The processing device can be configured to determine a difference between the second shopping cart count and the first shopping cart count. The difference can represent a retail environment shopping cart count. The processing device can be configured to estimate a customer count within the retail environment based on the retail environment shopping cart count.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed shopping cart corral system and associated systems and methods, reference is made to the accompanying figures, wherein:

FIG. 10 is a diagrammatic top view of a track of the shopping cart counter system of FIG. 5.

FIG. 11 is a diagrammatic top view of the shopping cart counter system of FIG. 5 including a track.

DETAILED DESCRIPTION

Exemplary embodiments of the present disclosure provide a shopping cart corral system and associated systems and methods that allow for an accurate and efficient estimation of customer traffic within a retail environment. In particular, based on an estimated shopping cart count within a shopping cart corral or enclosure, and the number of shopping carts entering and/or exiting the retail environment, the number of customers within the retail environment can be estimated. The disclosed systems estimate the real-time shopping cart density within the retail environment to infer the real-time customer count within the retail environment. Based on the customer traffic within the retail environment over various periods of time, a forecast of future customer traffic during specific days and times of day can be determined, and staffing can be adjusted to meet the needs of customers visiting the retail environment. Thus, greater employee and retail environment efficiencies can be achieved.

Figure 1:
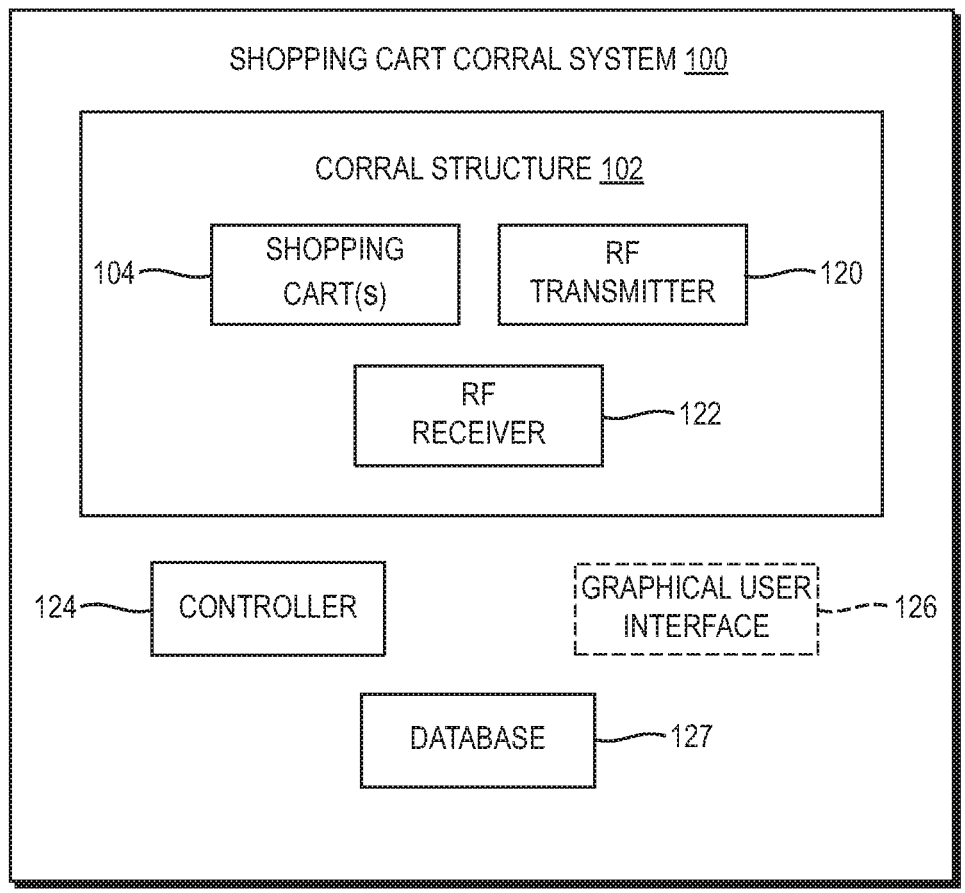
FIG. 1 is a block diagram of an exemplary shopping cart corral system of the present disclosure.
Figure 2:
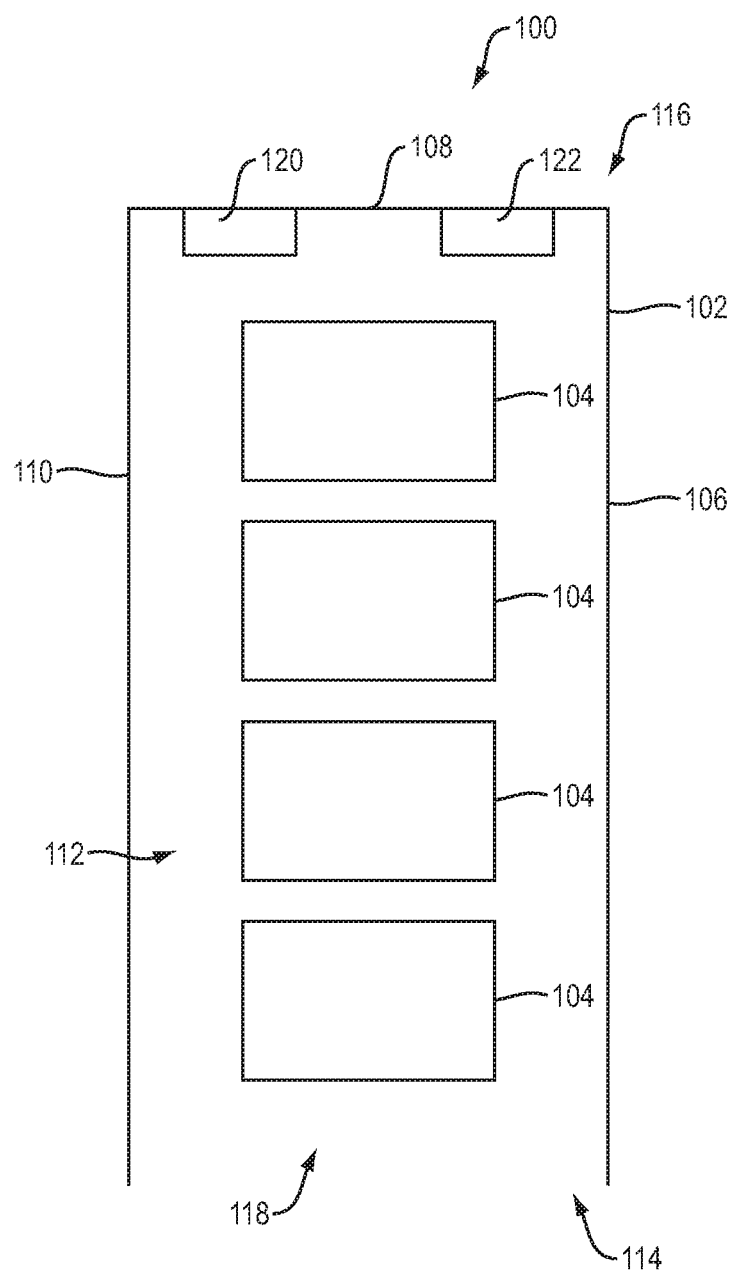
FIG. 2 is a diagrammatic top view of an exemplary shopping cart corral system of the present disclosure.

FIG. 1 is a block diagram of an exemplary shopping cart corral system 100 (hereinafter "system 100") in accordance with embodiments of the present disclosure. FIG. 2 is a diagrammatic, top view of the system 100 (e.g., an RF signal-based system). The system 100 generally includes one or more corral structures 102. The corral structure 102 can be disposed inside, outside, or both inside and outside, of the retail environment. The corral structure 102 can be configured and dimensioned to receive one or more shopping carts 104. In particular, the corral structure 102 can include walls 106-110 that form an enclosure 112 (e.g., an interior area) into which the shopping carts 104 can be introduced. The corral structure 102 includes a proximal end 114 and a distal end 116 disposed on opposite sides of the enclosure 112. The proximal end 114 includes an opening 118 for entrance and exit of the shopping carts 104 from the enclosure 112. In some embodiments, both the proximal end 114 and the distal end 116 can include openings similar to opening 118 for entrance and exit of shopping carts 104 from either end of the enclosure 112.

The corral structure 102 includes at least one radio-frequency (RF) transmitter 120 and at least one RF receiver 122 disposed in the enclosure 112. The RF transmitter 120 can be positioned within the enclosure 112 such that the RF transmitter 120 can transmit an RF signal having a first set of properties into the enclosure 112. The first set of properties of the transmitted RF signal can include a power, an amplitude, a phase, a frequency, and/or a polarization. In some embodiments, the RF transmitter 120 and/or the RF receiver 122 can be disposed at the distal end 116 of the corral structure 102. The RF signal interacts with (e.g., bounces off of as a result of reflection, refraction, and/or diffraction and is at least partially absorbed by) the shopping carts 104 disposed in the corral structure 102, and results in a reflected RF signal that is reflected back to and received by the RF receiver 122. The reflected RF wave can include a second set of properties that includes a power, an amplitude, a phase, a frequency, and/or a polarization. Due to interference/interaction created by the shopping carts 104 (e.g., the metal components of the shopping carts 104) disposed in the corral structure 102, the reflected RF signal has at least one property (e.g., power, amplitude, phase, frequency, polarization) that differs from the originally-transmitted RF signal (e.g., an attenuated power, an attenuated amplitude, a different phase, a different frequency, a different polarization).

A controller 124 of the system 100 can be operatively coupled to the RF receiver 122 via wired and/or wireless means. The controller 124 can be configured to receive as input the reflected RF signal received by the RF receiver 122 and, based on the reflected RF signal, estimate the quantity of shopping carts 104 disposed in the enclosure 112. In particular, the degree to which the shopping carts 104 interfere with the RF signal can increase as the number of shopping carts 104 disposed within the enclosure 112 increases. Based on the difference in the at least one property detected in the reflected RF signal relative to the transmitted RF signal, the number of shopping carts 104 within the enclosure 112 can be estimated.

As an example, the controller 124 can be configured to determine that zero (or approximately zero) shopping carts 104 are in the enclosure 112 of the corral structure 102 in response to a first value for the at least one property (e.g., a small change from the transmitted RF signal) in the reflected RF signal or to the failure to detect a reflected RF signal (e.g., an absence of a reflected RF signal). As a further example, the controller 124 can be configured to determine that approximately half of the enclosure 112 of the corral structure 102 is filled with shopping carts 104 in response to a second value for the at least one property (e.g., a medium change from the transmitted RF signal) in the reflected RF signal. As a further example, the controller 124 can be configured to determine that approximately three-quarters of the enclosure 112 of the corral structure 102 is filled with shopping carts 104 in response to a third value for the at least one property (e.g., a large change from the transmitted RF signal) in the reflected RF signal.

Although discussed as small, medium and large differences in the values between the transmitted and reflected RF signals, in some embodiments, the values can be in the form of numerical ranges. Thus, a scale or range of numerical values or percentages for the at least one property detected in the reflected RF signal relative to the number of shopping carts 104 in the enclosure 112 can be generated and applied by the controller 124 to provide an estimate of shopping carts 104 in the enclosure 112. Based on the correlation between the detected changes to the at least one property of the reflected RF signal as compared to the transmitted RF signal and the number of shopping carts 104, an accurate estimate of the number of shopping carts 104 can be provided. In some embodiments, the correlated values can estimate the number of shopping carts 104 by an accuracy of, e.g., individual shopping carts 104, two shopping carts 104, three shopping carts 104, four shopping carts 104, five shopping carts 104, or the like. In some embodiments, the system 100 can include a graphical user interface (GUI) 126 operatively coupled to the controller 124, the RF transmitter 120, and/or the RF receiver 122. The GUI 126 can be used to display the status of the components of the corral structure 102 (e.g., for maintenance) and can display the real-time value of the number of shopping carts 104 within each individual corral structure 102 (and a sum of shopping carts 104 within all of the corral structures 102) associated with the retail environment. The system 100 can include a database 127 configured to electronically store data corresponding to the number of shopping carts 104 disposed in the enclosure 112 during different days and times of day. As will be discussed in greater detail below, the data stored in the database 127 can be used to forecast the number of customers expected to be at the retail environment during specific days and times of day, and allows for the appropriate number of employees to be staffed for specific periods of time to meet the demands of customers.

The number of shopping carts 104 disposed in the corral structure(s) 102 provide(s) an estimate of the number of customers within the retail environment. In particular, the less shopping carts 104 disposed in the corral structure(s) 102, the more customers are estimated to be in the retail environment. In some embodiments, the system 100 can adjust the estimated values by taking into account the number of customers who enter the retail environment without a shopping cart 104. Thus, employee staffing can be rearranged to accommodate the large number of customers visiting the retail environment. In addition, if a low number of shopping carts 104 are detected within the corral structure 102, employees can be asked to gather the shopping carts 104 left in the parking lot or around the retail environment, and bring the shopping carts 104 to the corral structure(s) 102.

Figure 3:
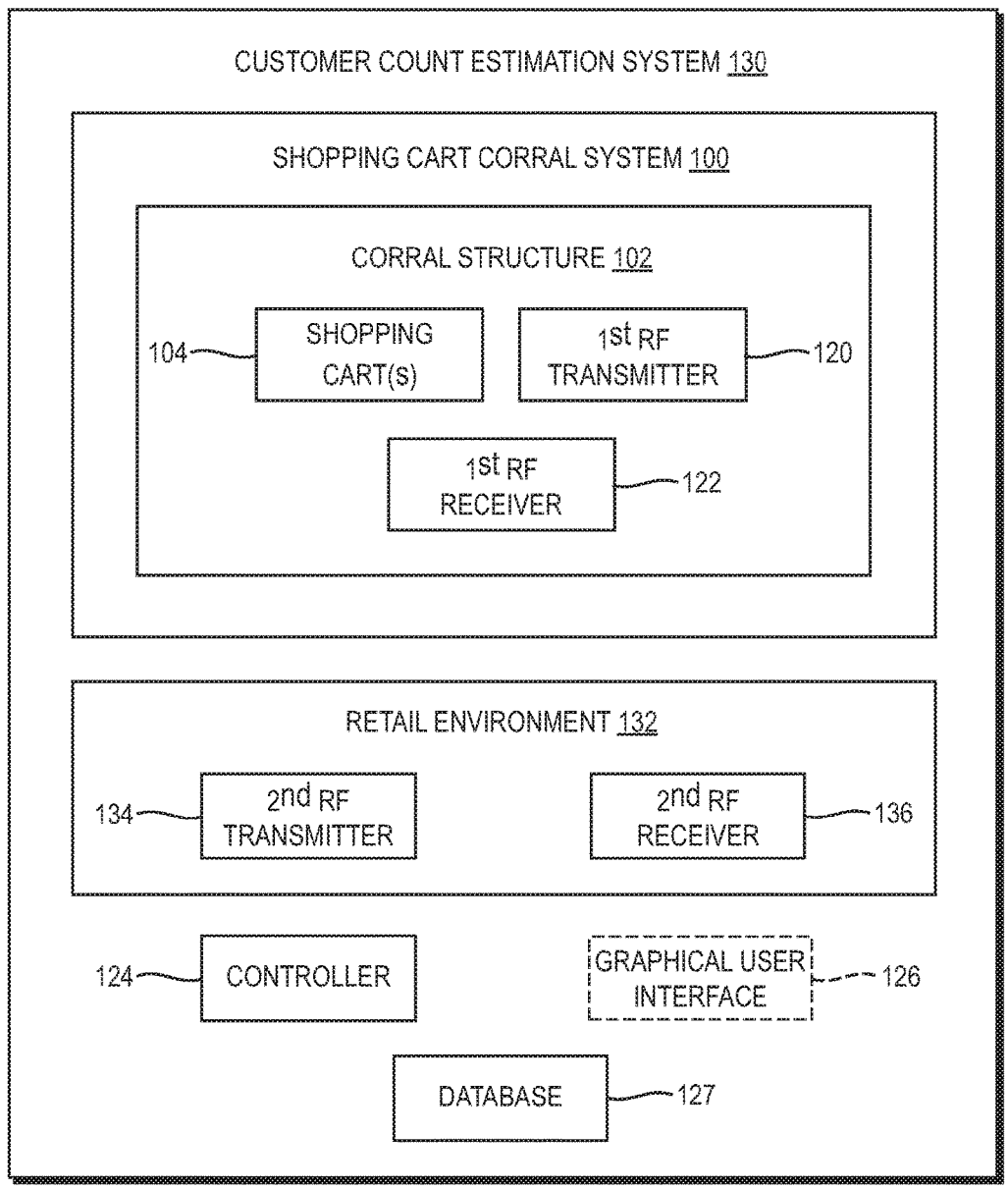
FIG. 3 is a block diagram of an exemplary customer count estimation system including the shopping cart corral system of FIG. 1.
Figure 4:
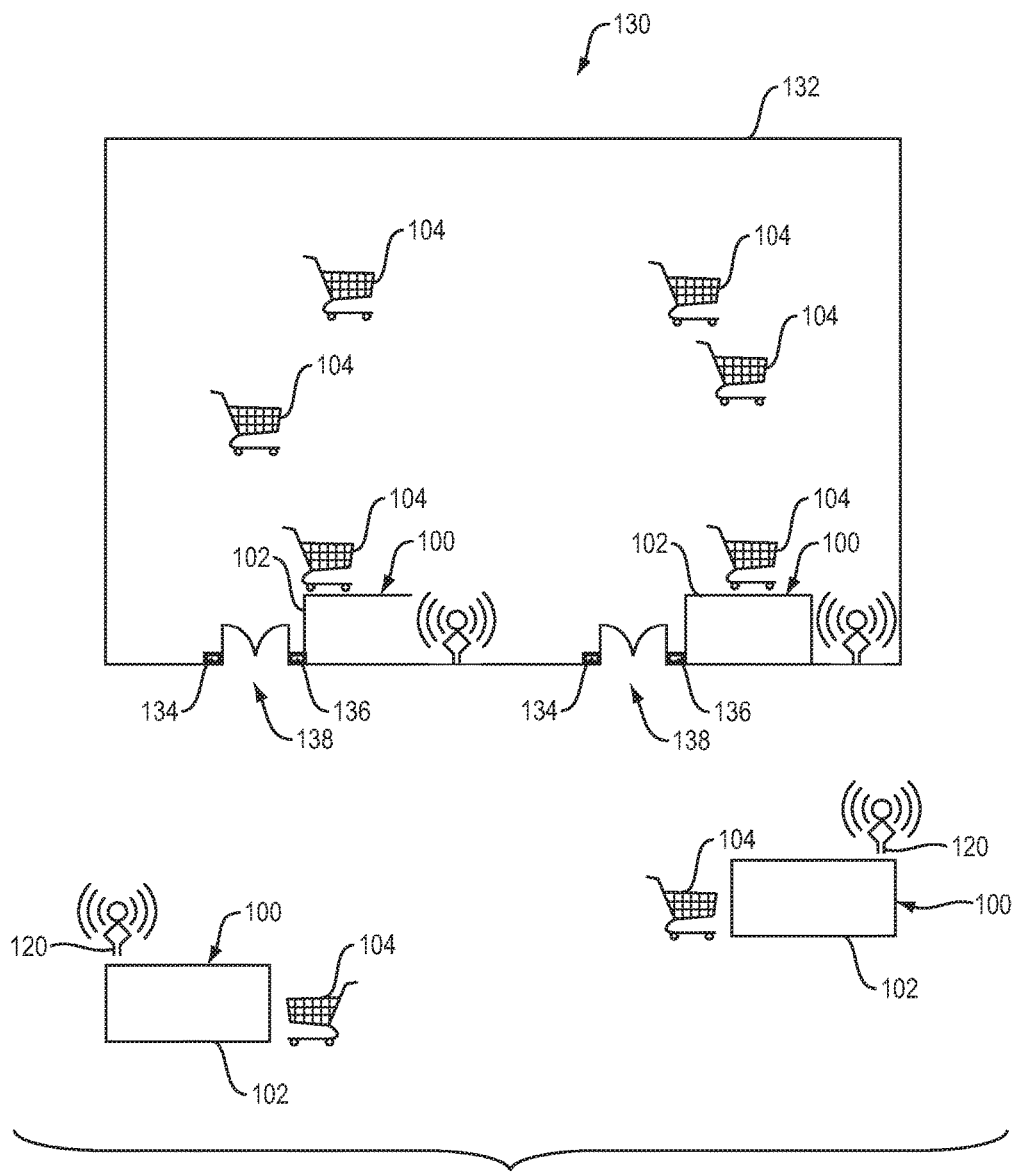
FIG. 4 is a block diagram of an exemplary customer count estimation system including the shopping cart corral system of FIG. 1.

FIGS. 3 and 4 are block diagrams of an exemplary customer count estimation system 130 (hereinafter "system 130"). The system 130 generally includes one or more systems 100 including corral structures 102. In particular, the RF transmitter 120 and the RF receiver 122 of each corral structure 102 can act as the first RF transmitter and receiver, respectively. As noted above, the RF transmitter 120 transmits an RF signal (e.g., a first RF signal) having a first set of properties and a reflected RF signal (e.g., a first reflected RF signal) can be generated based on the first RF signal that has a second set of properties, which can be used to estimate the quantity of shopping carts 104 in the corral structure 102. The system 130 includes a retail environment 132 (e.g., a store). As shown in FIG. 4, the system 100 can be disposed inside and/or outside of the retail environment 132.

The retail environment 132 includes one or more RF transmitters 132 (e.g., second RF transmitters) and one or more RF receivers 134 (e.g., a second RF receivers). The RF transmitter 132 can be disposed at an entrance 138 of the retail environment 132. The RF transmitter 132 can be configured to transmit an RF signal (e.g., a second RF signal) into and/or across the entrance 138. As customers with shopping carts 104 enter and exit the retail environment 132 through the entrance 138, the transmitted RF signal interacts with the shopping carts 104 to generate a second reflected RF signal. The second reflected RF signal can have different properties than the transmitted RF signal due to interference/interaction created by shopping carts 104 passing through the entrance 138. The RF receiver 136 can be configured to receive the reflected RF signal.

Based on the reflected RF signal, the controller 124 can estimate the number of shopping carts 104 that are disposed within the retail environment 132. Based on the estimated number of shopping carts 104 disposed in each of the corral structures 102 and the estimated number of shopping carts 104 disposed in the retail environment 132, the controller 124 can estimate the customer count within the retail environment 132. In particular, the RF transmitter 134 and RF receiver 136 can determine the number of shopping carts 104 entering and exiting the retail environment 132. The difference between these values can indicate the number of customers within the retail environment 132. This value can be supplemented with the estimated count at the corral structures 102 to accurately estimate the number of customers within the retail environment 132.

In some embodiments, the RF transmitters/receivers at the corral structure 102 and/or the retail environment 132 can be supplemented or replaced with a mechanical counter for counting the number of shopping carts 104 within the corral structure 102 or the retail environment 132. The system 130 can include a database 127 configured to electronically store data corresponding to the number of shopping carts 104 disposed in the corral structure 102 and the retail environment 132 during different days and times of day. As will be discussed in greater detail below, the data stored in the database 127 can be used to forecast the number of customers expected to be at the retail environment 132 during specific days and times of day, and allows for the appropriate number of employees to be staffed for specific periods of time to meet the demands of customers.

Figure 5:
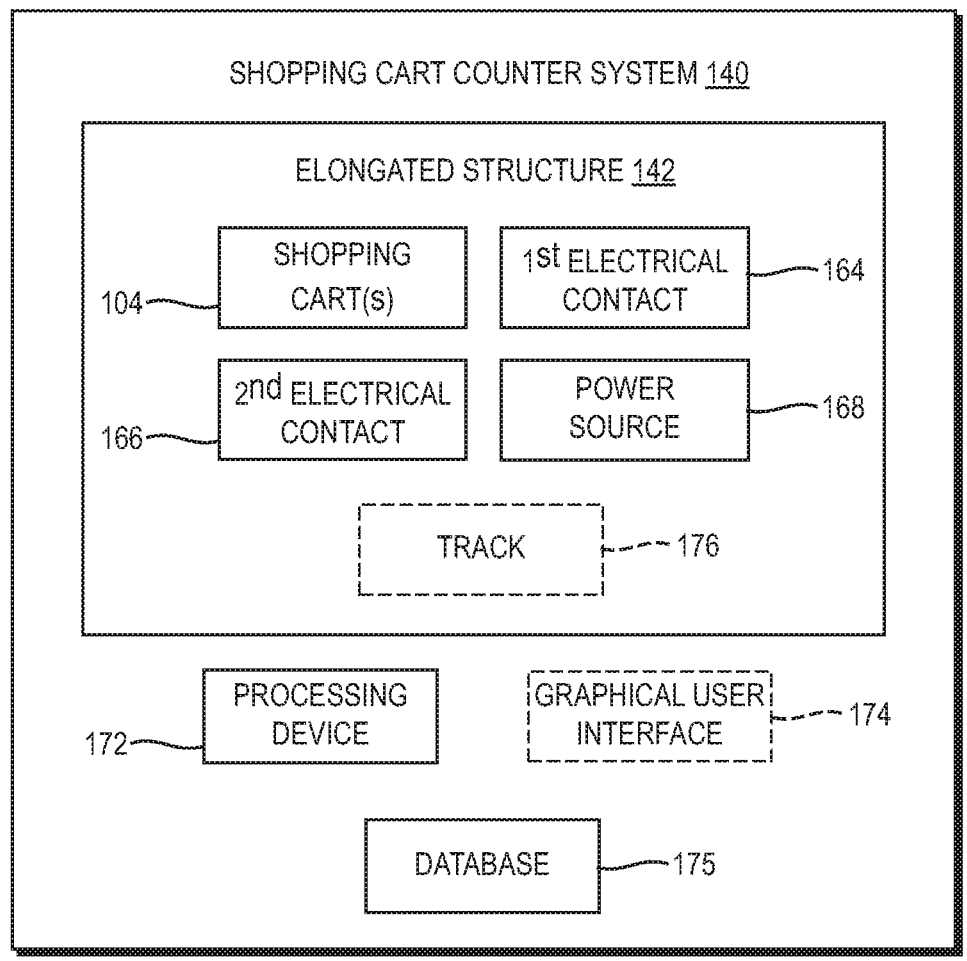
FIG. 5 is a block diagram of an exemplary shopping cart counter system of the present disclosure.
Figure 6:
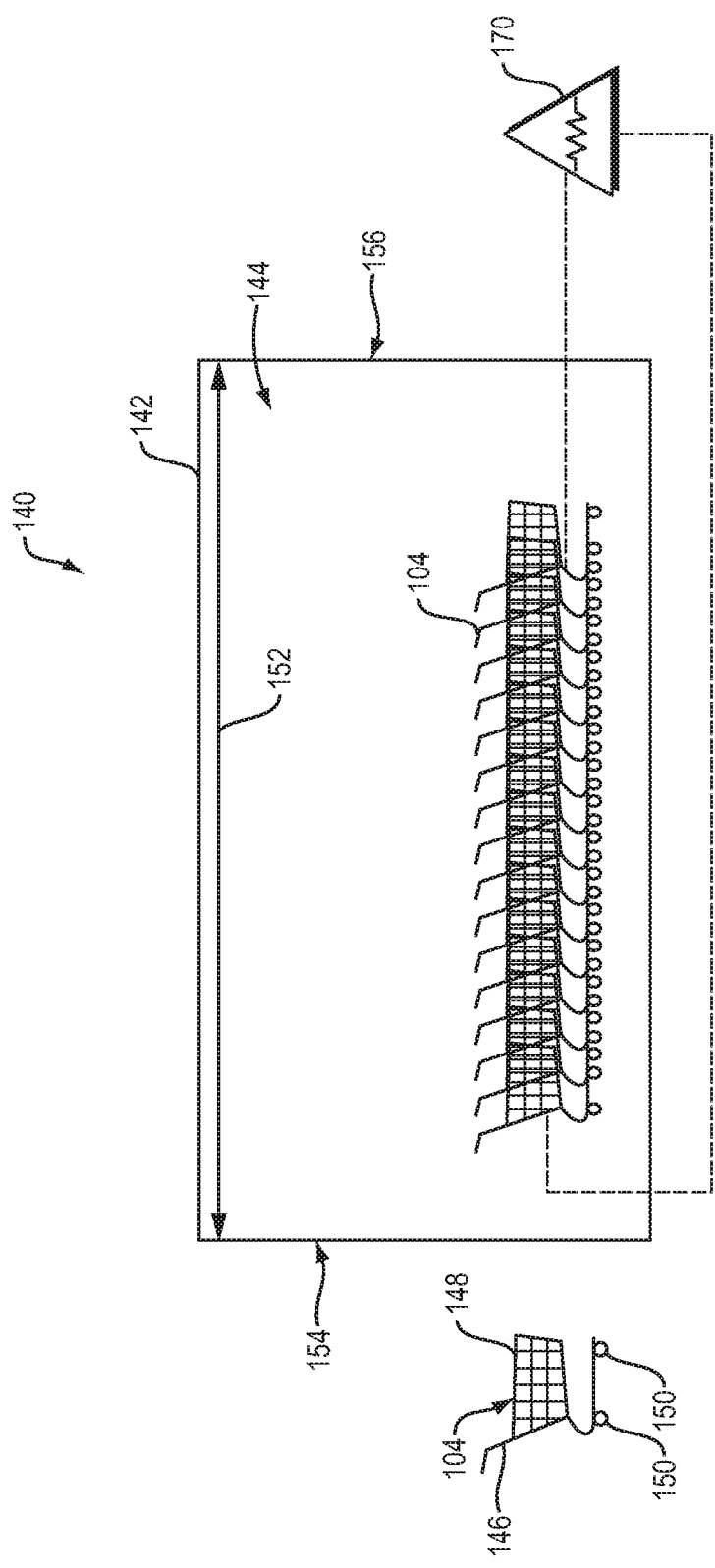
FIG. 6 is a diagrammatic view of the shopping cart counter system of FIG. 5.
Figure 7:
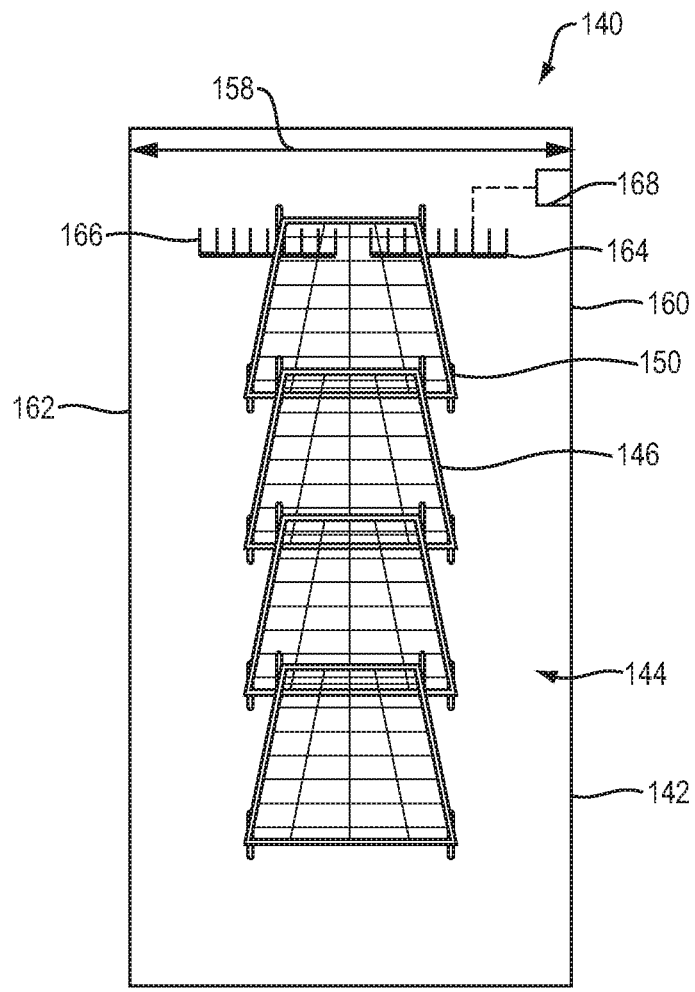
FIG. 7 is a diagrammatic top view of the shopping cart counter system of FIG. 5.
Figure 8:
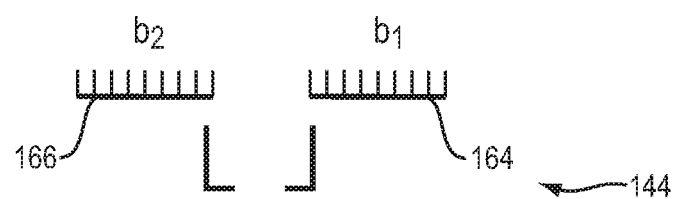
FIG. 8 is a diagrammatic view of a first and second electrical contact of the shopping cart counter system of FIG. 5.
Figure 9:
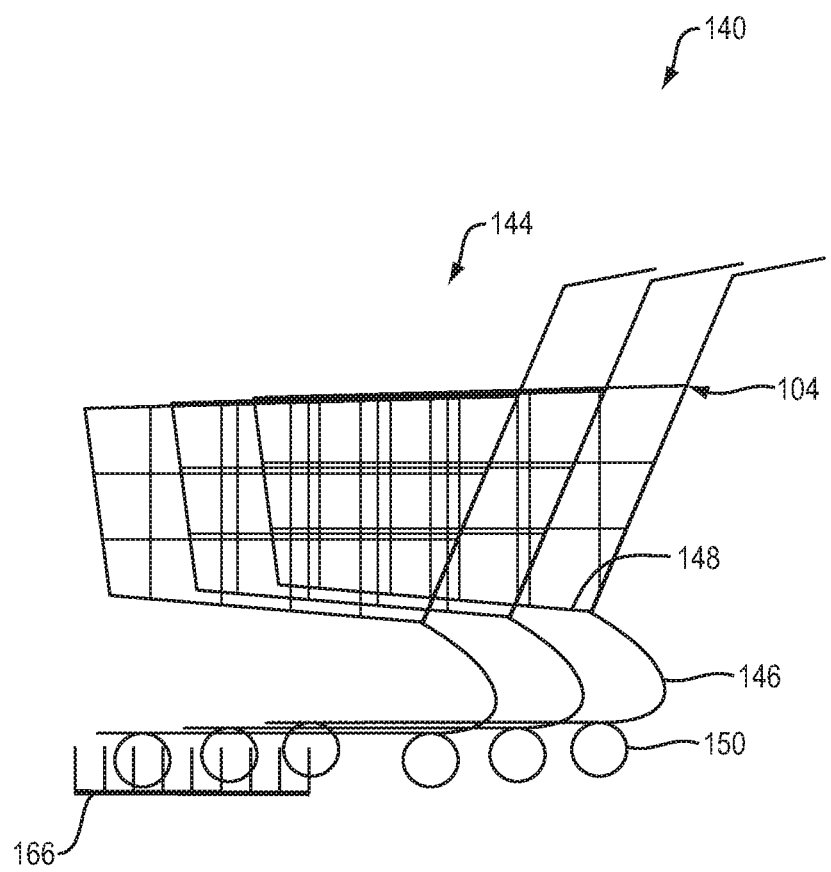
FIG. 9 is a diagrammatic side view of the shopping cart counter system of FIG. 5.
Figure 12:
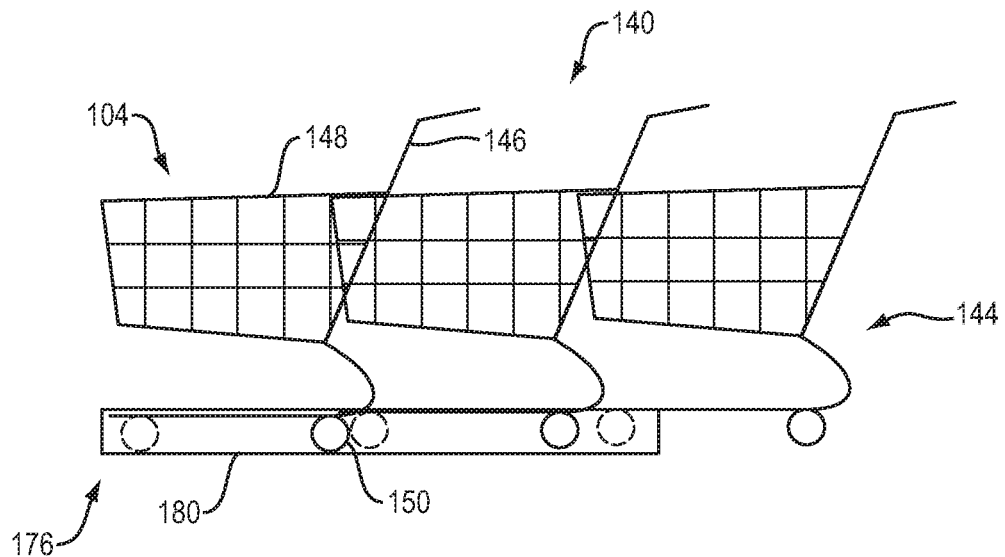
FIG. 12 is a diagrammatic side view of the shopping cart counter system of FIG. 5 including a track.

FIG. 5 is a block diagram of an exemplary shopping cart counter system 140 (hereinafter "system 140") in accordance with embodiments of the present disclosure. FIGS. 6-13 are diagrammatic views of the system 140 (e.g., a resistance-based system). The system 140 generally includes an elongated structure 142 (e.g., a shopping cart corral) configured and dimensioned with an interior area 144 for receiving one or more shopping carts 104. Each of the shopping carts 104 generally includes a frame 146, a basket section 148, and a plurality of wheels 150 rotatably secured to the bottom of the frame 146. When the shopping carts 104 are stacked within the elongated structure 142, the frames 146 of the shopping carts 104 can be configured to touch in at least one area of the shopping cart 104 (e.g., metal-on-metal contact).

The elongated structure 142 defines a length 152 extending between a proximal end 154 and a distal end 156. The elongated structure 142 defines a width 158 extending and measured between a first side 160 and a second side 162 of the elongated structure 142. The system 140 includes a first electrical contact 164 and a second electrical contact 166 (e.g., first and second wire brushes) disposed within the elongated structure 142. The first and second electrical contacts 164, 166 can be disposed on either the first or second side 160, 162 of the elongated structure 142. In some embodiments, the first electrical contact 164 can be disposed at or near the first side 160 of the elongated structure 142, and the second electrical contact 166 can be disposed at or near the second side 162 of the elongated structure 142. In particular, the first and second electrical contacts 164, 166 can be disposed on opposing sides of the elongated structure 142 and the shopping carts 104 within the elongated structure 142. Further, the first and second electrical contacts 164, 166 can be disposed such that when a shopping cart 104 is disposed within the elongated structure 142, the wheels 150 and/or the frame 146 contacts each of the first and second electrical contacts 164, 166.

The system 130 includes a power source 168. In some embodiments, the power source 168 can be disposed within the elongated structure 142. In some embodiments, the power source 168 can be disposed outside of the elongated structure 142. The power source 168 can be electrically coupled to the first electrical contact 164 (and/or second electrical contact 166). The power source 168 can be configured to apply a low voltage or an electrical current to the first electrical contact 164. When a shopping cart 104 is disposed in the elongated structure 142, one or more components of the shopping cart 104 create an electrical contact between the shopping cart 104 and the first and second electrical contacts 164, 166. Thus, the shopping cart 104 completes an electrical circuit 170 between the first and second electrical contacts 164, 166. In particular, the voltage or electrical current applied to the first electrical contact 164 travels from the first electrical contact 164 to the shopping cart 104, through the frame 146 of the shopping cart 104, and into the second electrical contact 166. In some embodiments, the second electrical contact 166 can act as the ground for the electrical circuit 170, and a measurement of the resistance in the electrical circuit 170 can be taken between the first and second electrical contacts 164, 166. In some embodiments, the voltage drop across and/or the electrical current flowing through the shopping carts can be measured. In some embodiments, the position of the first and second electrical contacts 164, 166 results in the resistance, voltage, and/or current measurement being made across the width of the shopping cart 104.

The system 100 includes a processing device 172 coupled to the first and/or second electrical contacts 164, 166 and configured to receive data associated with the voltage or electrical current passing through the electrical circuit 170. In particular, if there are no shopping carts 104 disposed in the elongated structure 142, the electrical circuit 170 is not completed and the processing device 172 determines that no shopping carts 104 are disposed in the elongated structure 142. If a shopping cart 104 is disposed in the elongated structure 142 and the electrical circuit 170 is complete, the processing device 172 can be configured to measure or detect the electrical resistance caused by the shopping cart 104, a voltage drop across the shopping cart 104, and/or an electrical current flowing through the shopping cart 104. Based on the amount of electrical resistance, the voltage drop, and/or the electrical current detected, the processing device 172 can be configured to estimate the quantity of shopping carts 104 disposed within the interior area 144 of the elongated structure 142. For example, the greater the number of shopping carts 104 within the elongated structure 142, the higher the detected electrical resistance when the electrodes are configured for parallel conduction through the shopping carts (e.g., from one side to the other) or the greater the detected resistance when the electrodes are configured to series conduction through the shopping carts (e.g., from the front to the back). In some embodiments, the power source can be a constant voltage source such that the electrical current flowing through the shopping carts 104 can change based on the resistance of the shopping carts 104. In some embodiments, the power source can be a constant current power source such that the voltage drop across the shopping carts 104 can change based on the resistance of the shopping carts 104. A scale of numerical ranges for electrical resistance, electrical current, and/or voltage drop can be correlated to the number of shopping carts 104 disposed in the elongated structure 142. Therefore, the processing device 172 can receive as input the detected electrical resistance, electrical current, and/or voltage drop, and can output (e.g., via the GUI 174) the number of shopping carts 104 disposed in the elongated structure 142.

Figure 13:
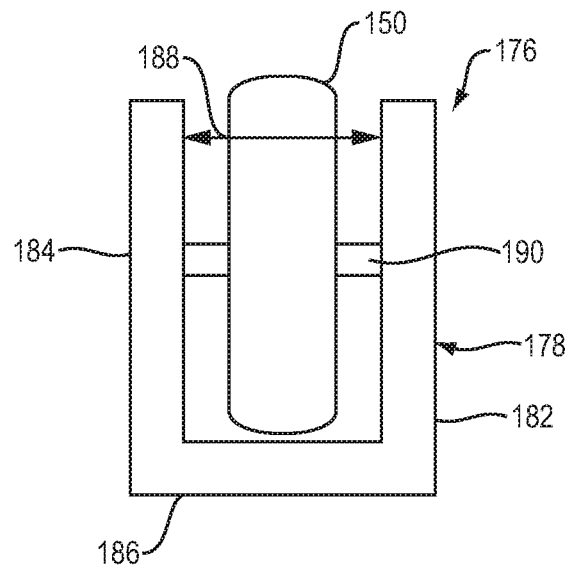
FIG. 13 is a diagrammatic detailed view of a track of the shopping cart counter system of FIG. 5.

In some embodiments, the system 130 can include a track 176. The elongated track 176 can be disposed within the elongated structure 142, and includes a first track path 178 and a second track path 180. As shown in FIG. 13, each of the first and second track paths 178, 180 can define a U-shaped structure. The U-shaped structure includes a first side wall 182, a second side wall 184, and a bottom wall 186 connecting the first and second side walls 182, 184. The width 188 between the inner surfaces of the first and second side walls 182, 184 can be configured and dimensioned to receive the wheel 150 of the shopping cart 104. In particular, the axle 190 passing through the wheel 150 and extending from the opposing sides of the wheel 150 can contact the inner surface of the first and second walls 182, 184 to create an electrical contact between the wheel 150 and the respective first and second track paths 180. Thus, an electrical connection between the shopping cart 104 and the track 176 can be created. In some embodiments, a pad can be disposed on the bottom surface of the elongated structure 142 to electrically connect all of the shopping carts 104 disposed within the elongated structure 142. The pad thereby ensures that the entire stacked line of shopping carts 104 is taken into account for the resistance measurement.

Figure 14:
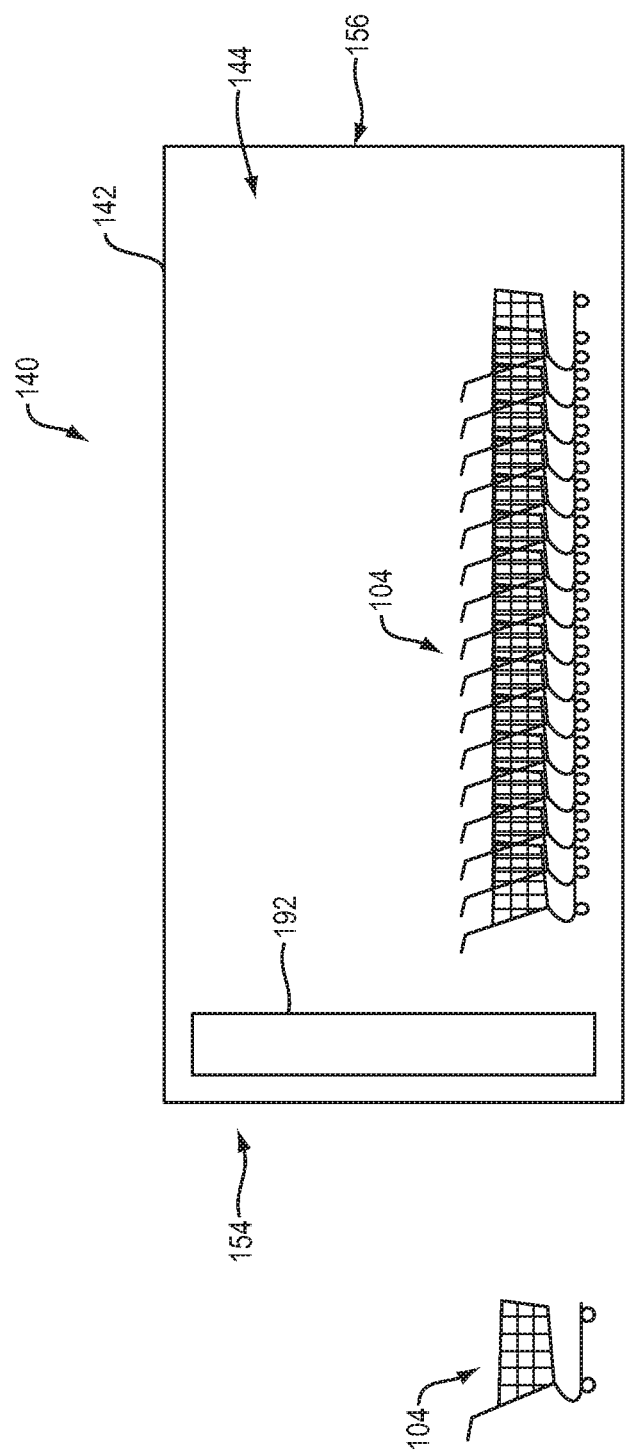
FIG. 14 is a diagrammatic view of the shopping cart counter system of FIG. 5 including a mechanical counter.

The power source 168 can apply the voltage or electrical current to the first track path 178. The shopping cart 104 with the wheels 150 disposed in the track 176 completes the electrical circuit between the first and second track paths 178, 180, and the processing device 172 detects the electrical resistance, electrical current, and/or voltage drop in the circuit to estimate the number of shopping carts 104 disposed in the elongated structure 142. Based on the estimated number of shopping carts 104 disposed in the elongated structure 142, the processing device 172 can estimate the number of customers within the retail environment. In some embodiments, as shown in FIG. 14, in addition or as an alternative to the electrical contacts or track, the system 140 can include a mechanical counter 192 disposed within the elongated structure 142 for counting the number of shopping carts 104 entering and exiting the elongated structure 142. The system 140 can include a database 175 configured to electronically store data corresponding to the number of shopping carts 104 disposed in the elongated structure 142 during different days and times of day. As will be discussed in greater detail below, the data stored in the database 175 can be used to forecast the number of customers expected to be at the retail environment during specific days and times of day, and allows for the appropriate number of employees to be staffed for specific periods of time to meet the demands of customers.

Figure 15:
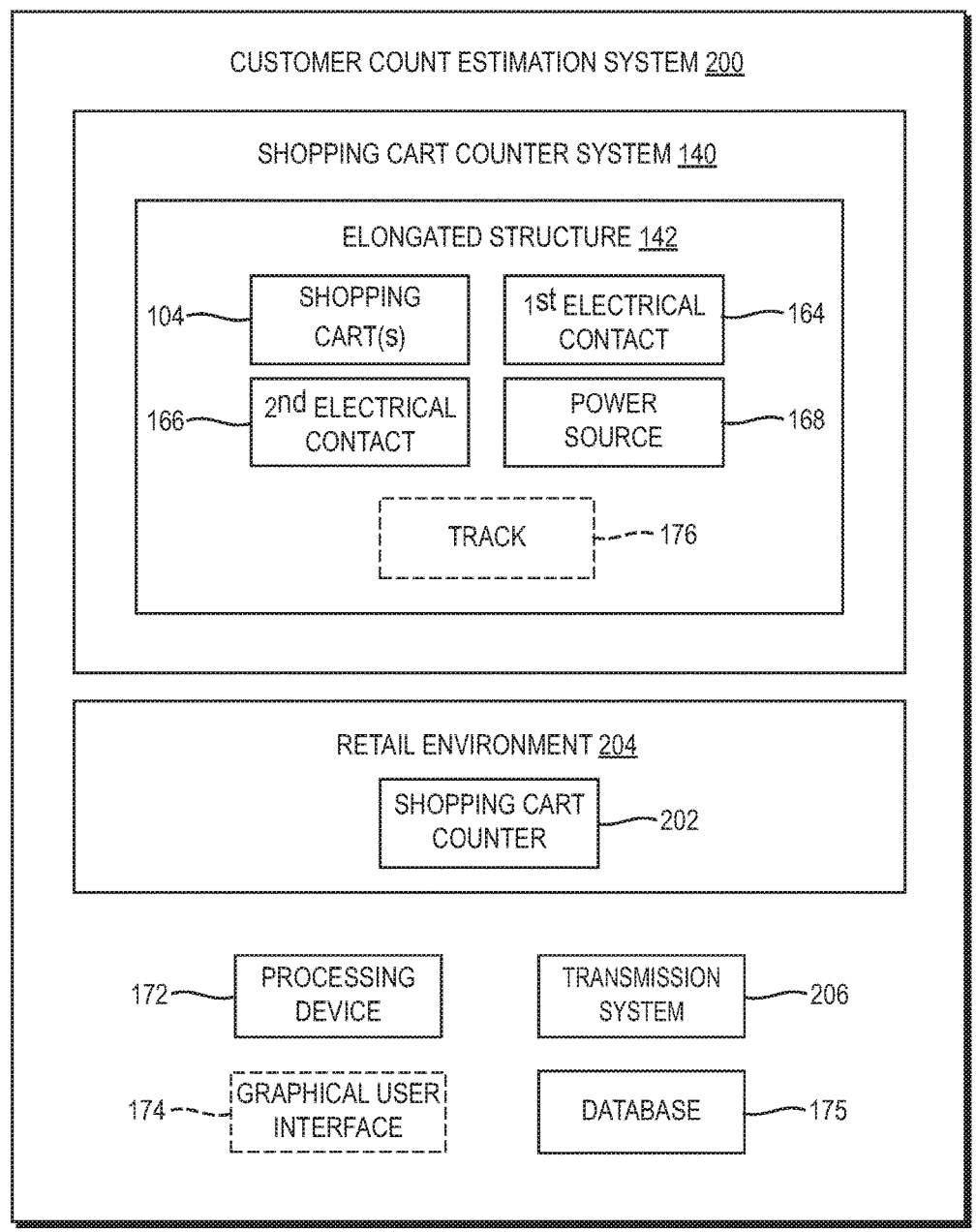
FIG. 15 is a block diagram of an exemplary customer count estimation system of the present disclosure.

FIG. 15 is a block diagram of an exemplary customer count estimation system 200 (hereinafter "system 200") in accordance with embodiments of the present disclosure. The system 200 includes one or more shopping cart counter systems 140 discussed above. In addition, the system 200 includes a shopping cart counter 202 disposed at the entrance of the retail environment 204. The shopping cart counter 202 can be in the form of, e.g., a mechanical counter, an RF signal-based counter as discussed above, or the like. In particular, the shopping cart counter 202 can determine the number of shopping carts 104 within the retail environment by adding the number of shopping carts 104 entering the retail environment and subtracting the number of shopping carts 104 leaving the retail environment.

Based on a difference between the estimated number of shopping carts 104 within the elongated structure 142 and the number of shopping carts 104 determined to be within the retail environment by the shopping cart counter 202, the processing device 172 can estimate the retail environment shopping cart count (e.g., the number of shopping carts 104 within the retail environment). Further, based on the retail environment shopping cart count, the processing device 172 can estimate the customer count within the retail environment. The customer count can be used to schedule and/or redistribute employee staffing to adequately serve the needs of the customers within the retail environment.

For example, if one entrance of the retail environment is determined to be busier than the other entrances, employees can be redistributed to attend to customers at the busiest entrance. As a further example, if an influx of customers is detected, employees from non-customer areas can be diverted to customer areas to assist in attending to customers. As a further example, if the number of shopping carts 104 at the elongated structure 142 (e.g., the shopping cart corral) is determined to be low or decreasing, the system 200 can estimate that the point-of-sale terminals of the retail environment will be busy in a predetermined period of time, e.g., approximately 30 minutes. Retail environments can thereby plan ahead to redistribute employees to attend to customers who are at the point-of-sale terminals.

In some embodiments, the collected data can be used to forecast the number of customers expected during specific days and times of day. For example, the collected data can indicate that the number of shopping carts 104 at the elongated structure 142 decreases and the number of shopping carts 104 entering the retail environment increases at approximately 5:00 PM on Fridays, and the point-of-sale terminals are busy at approximately 6:30 PM. Based on such data, employees can be scheduled to assist at the entrances of the retail environment at approximately 5:00 PM on Fridays, and the employees can be redistributed shortly before 6:30 PM to the point-of-sale terminals to assist with customers checking out.

In addition, the number of shopping carts 104 within the elongated structure 142 can be used to request employees to collect and bring shopping carts 104 to the elongated structures 142 for customer use. In some embodiments, the system 200 can include a transmission system 206 configured to transmit and receive data between the system 140, the shopping cart counter 202, and the processing device 172. The system 200 can include a database 175 configured to electronically store data corresponding to the number of shopping carts 104 disposed in the elongated structure 142 during different days and times of day. As will be discussed in greater detail below, the data stored in the database 175 can be used to forecast the number of customers expected to be at the retail environment during specific days and times of day, and allows for the appropriate number of employees to be staffed for specific periods of time to meet the demands of customers.

Figure 16:
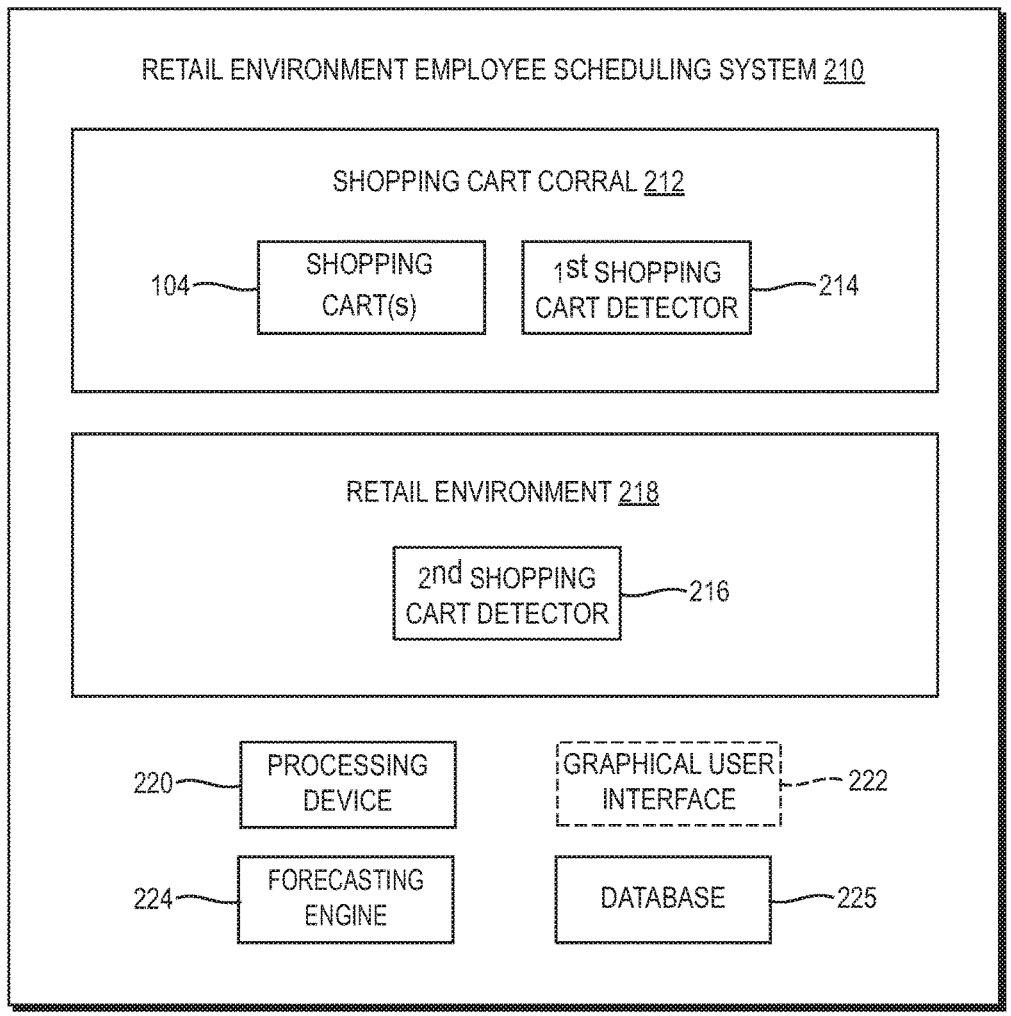
FIG. 16 is a block diagram of an exemplary retail environment employee scheduling system of the present disclosure.

FIG. 16 is a block diagram of an exemplary retail environment employee scheduling system 210 (hereinafter "system 210") in accordance with embodiments of the present disclosure. The system 210 includes a shopping cart corral 212 configured and dimensioned to receive therein one or more shopping carts 104. The system 210 includes a first shopping cart detector 214 disposed at the shopping cart corral 212. The first shopping cart detector 214 can be in the form of, e.g., an RF signal-based system, a resistance-based system, a mechanical counter, or combinations thereof. The system 210 includes a second shopping cart detector 216 disposed at an entrance of the retail environment 218. The second shopping cart detector 216 can be in the form of, e.g., an RF signal-based system, a mechanical counter, or combinations thereof.

In some embodiments, the system 210 can include a basket detector (e.g., a mechanical counter, a weight-based counter, or the like) configured to determine the number of shopping baskets returned to basket collection stations. The number of shopping baskets at the basket collection stations can be incorporated into the analysis discussed herein to determine the number of customers in the retail environment 218. In particular, in addition to customers with shopping carts 104, the system 210 can take into account the number of customers with shopping baskets to accurately determine the number of customers in the retail environment 218.

The system 210 includes a processing device 220, a GUI 222, and a forecasting engine 224. The processing device 220 can be configured to determine a first shopping cart count with the first shopping cart detector 214, which represents a number of shopping carts 104 within the shopping cart corral 212. The processing device 220 can be configured to determine a second shopping cart count with the second shopping cart detector 216, which represents a number of shopping carts 104 entering the retail environment 218 through an entrance. Based on a difference of the first and second shopping cart counts, the processing device 220 can estimate a retail environment shopping cart count. Based on the retail environment shopping cart count, the processing device 220 can estimate a customer count within the retail environment. In particular, the number of shopping carts 104 within the retail environment 218 can be representative of the number of customers within the retail environment 218.

The system 210 can include a database 225 configured to electronically store data corresponding to the number of shopping carts 104 disposed in the shopping cart corral 212 and the retail environment 218 during different days and times of day. The data stored in the database 225 can be used to forecast the number of customers expected to be at the retail environment 218 during specific days and times of day, and allows for the appropriate number of employees to be staffed for specific periods of time to meet the demands of customers. In particular, the stored data can be analyzed by the processing device 220 to determine days and times of day corresponding to peak customer counts (e.g., peak customer traffic within the retail environment 218). Based on patterns in the peak customer counts, the processing device 220 can output specific days and times of day and the number of estimated employees to be scheduling for the specific days and times of day to appropriately meet the needs of customers visiting the retail environment. Based on the forecast values, accurate scheduling of employees can be made, resulting in a positive experience for customers visiting the retail environment 218.

Figure 17:
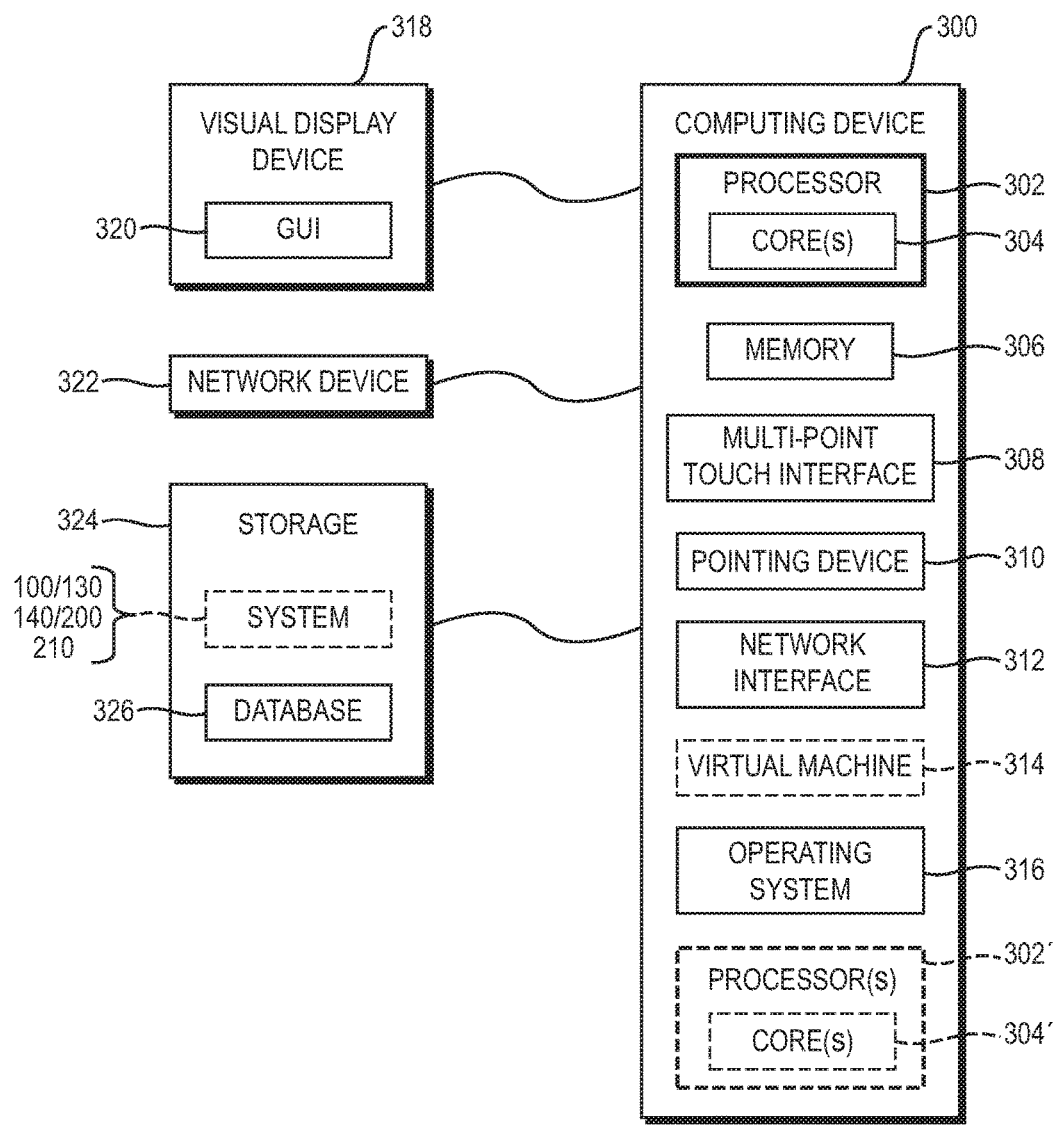
FIG. 17 is a block diagram of a computing device of the present disclosure.

FIG. 17 is a block diagram of a computing device 300 in accordance with exemplary embodiments of the present disclosure. In some embodiments, the computing device 300 function as a controller and can include one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 306 included in the computing device 300 may store computer-readable and computer-executable instructions or software for implementing exemplary embodiments of the present disclosure (e.g., the RF transmitter(s), the RF receiver(s), the power source(s), or the like). The computing device 300 also includes configurable and/or programmable processor 302 and associated core 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for controlling system hardware. Processor 302 and processor(s) 302' may each be a single core processor or multiple core (304 and 304') processor.

Virtualization may be employed in the computing device 300 so that infrastructure and resources in the computing device 300 may be shared dynamically. A virtual machine 314 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with the computing device 300 through a visual display device 318, such as a computer monitor, which may display one or more user interfaces 320 (e.g., GUI 126, GUI 174, GUI 222) that may be provided in accordance with exemplary embodiments. The computing device 300 may include other I/O devices for receiving input from a user, for example, a keyboard or any suitable multi-point touch interface 308, a pointing device 310 (e.g., a mouse). The keyboard 308 and the pointing device 310 may be coupled to the visual display device 318. The computing device 300 may include other suitable conventional I/O peripherals.

The computing device 300 may also include one or more storage devices 324, such as a hard-drive, CD-ROM, or other computer readable media, for storing data and computer-readable instructions and/or software that implement exemplary embodiments of the disclosed systems, combinations thereof, or the like, described herein. Exemplary storage device 324 may also store one or more databases 326 for storing any suitable information required to implement exemplary embodiments. For example, exemplary storage device 324 can store one or more databases 127, 175, 225 for storing information, such as data representative of the number of shopping carts within corral structures and/or the retail environment, or the like, and computer-readable instructions and/or software that implement exemplary embodiments described herein. The databases 326 may be updated by manually or automatically at any suitable time to add, delete, and/or update one or more items in the databases.

The computing device 300 can include a network interface 312 configured to interface via one or more network devices 322 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 312 may include a built-in network adapter, network interface card, PCMCIA network card, card bus network adapter, wireless network adapter, USB network adapter, modem or any other device suitable for interfacing the computing device 300 to any type of network capable of communication and performing the operations described herein. Moreover, the computing device 300 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 300 may run any operating system 316, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 316 may be run in native mode or emulated mode. In an exemplary embodiment, the operating system 316 may be run on one or more cloud machine instances.

Figure 18:
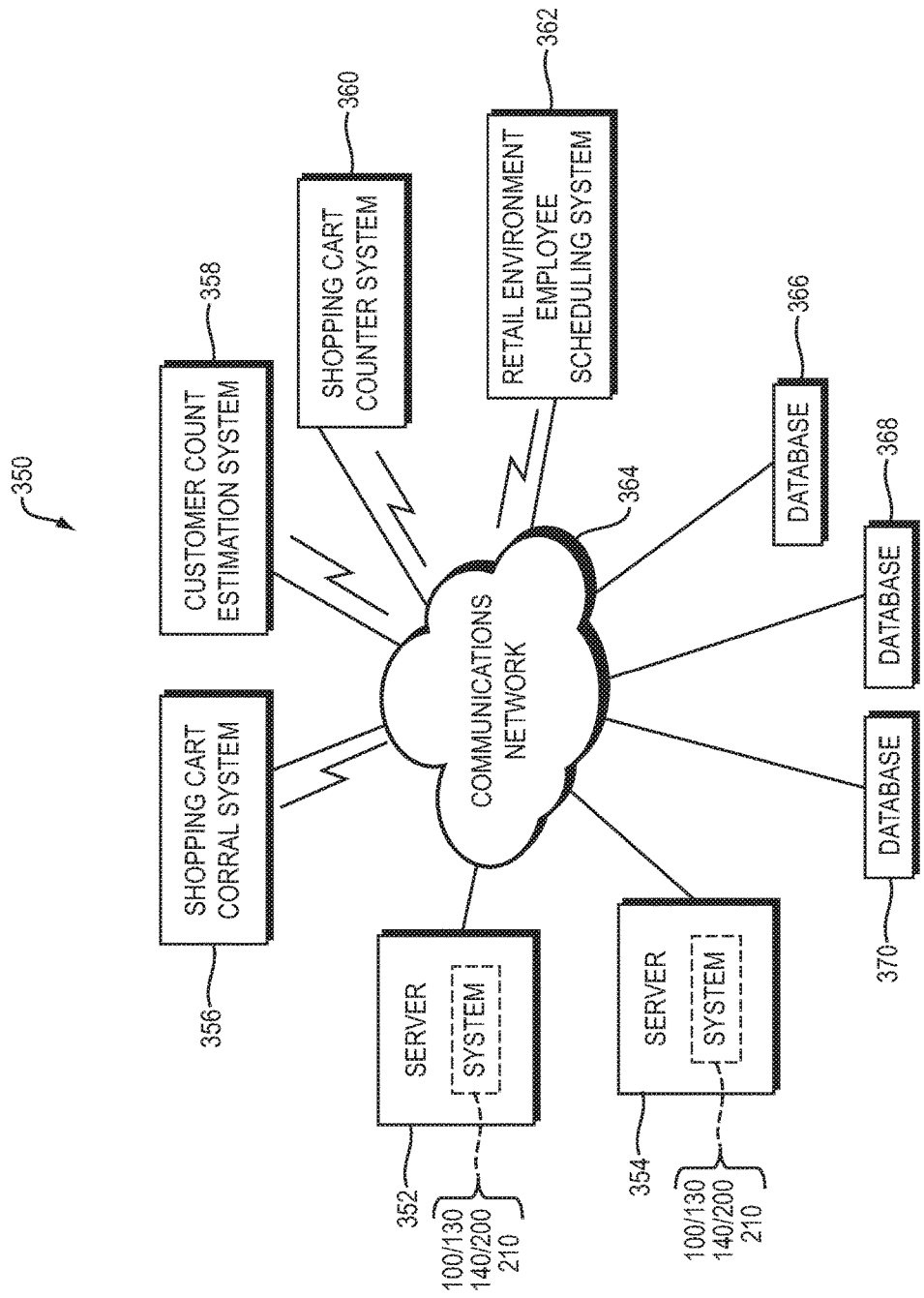
FIG. 18 is a block diagram of an exemplary shopping cart corral system environment of the present disclosure.

FIG. 18 is a block diagram of an exemplary peripheral device implementation system environment 350 in accordance with exemplary embodiments of the present disclosure. The environment 350 can include servers 352, 354 operatively coupled to shopping cart corral system(s) 356, customer count estimation system(s) 358, shopping cart counter system(s) 360, and retail environment employee scheduling system(s) 362, via a communication network 364, which can be any network over which information can be transmitted between devices communicatively coupled to the network. For example, the communication network 364 can be the Internet, Intranet, virtual private network (VPN), wide area network (WAN), local area network (LAN), and the like. In some embodiments, the communication network 364 can be part of a cloud environment (e.g., the cloud environment 106).

The environment 350 can include repositories or databases 366-370, which can be operatively coupled to the servers 352, 354, as well as to the systems 356-362, via the communications network 364. In exemplary embodiments, the servers 352, 354 and the databases 366-370 can be implemented as computing devices (e.g., computing device 300). Those skilled in the art will recognize that the databases 366-370 can be incorporated into one or more of the servers 352, 354 such that one or more of the servers 352, 354 can include databases 366-370. In some embodiments, the database 366 can store data associated with the number of shopping carts in the shopping cart corral(s), and the database 368 can store data associated with the number of shopping carts in the retail environment. GUIs can provide an interface between the servers 352, 354, the databases 366-370, and the systems 356-362 via the communication network 364.

Figure 19:
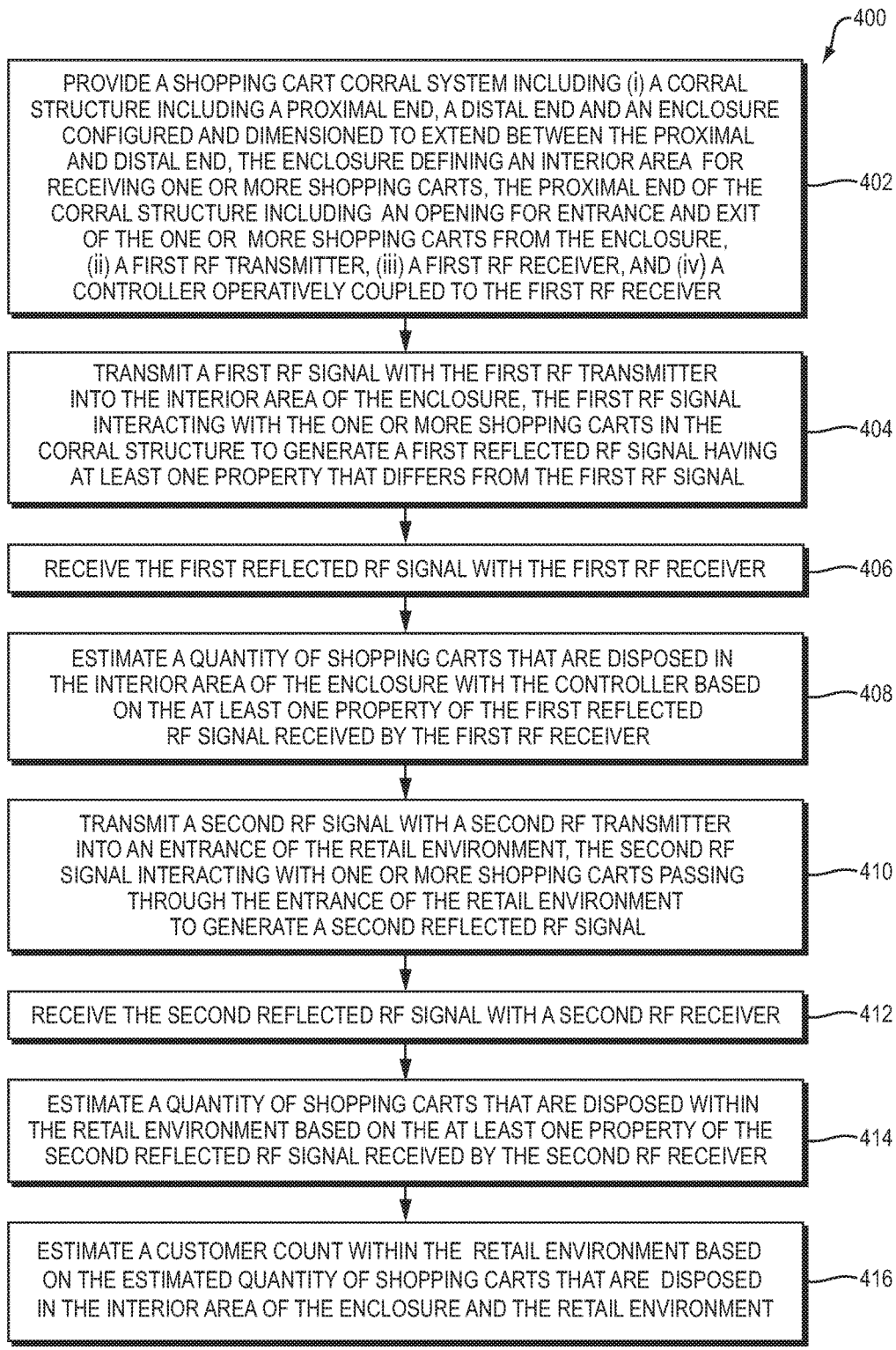
FIG. 19 is a flowchart illustrating an implementation of an exemplary customer count estimation system of the present disclosure.

FIG. 19 is a flowchart illustrating an exemplary process 400 as implemented by a customer count estimation system disclosed herein. To begin at step 402, a shopping cart corral system can be provided that includes a corral structure, a first RF transmitter, a first RF receiver, and a controller operatively coupled to the first RF receiver. At step 404, a first RF signal can be transmitted with the first RF transmitter into the interior area of the enclosure. The first RF signal can interact with the one or more shopping carts in the corral structure to generate a first reflected RF signal having at least one property that differs from the first RF signal. At step 406, the first reflected RF signal can be received with the first RF receiver. At step 408, a quantity of shopping carts that are disposed in the interior area of the enclosure can be estimated with the controller based on the at least one property of the first reflected RF signal received by the first RF receiver.

In some embodiments, based on the determination in step 408, the customer count within a retail environment can be estimated. In some embodiments, steps 410-414 can be performed to supplement the determination in step 408. In particular, at step 410, a second RF signal can be transmitted with a second RF transmitter into an entrance of the retail environment. The second RF signal can interact with one or more shopping carts passing through the entrance of the retail environment to generate a second reflected RF signal. At step 412, the second reflected RF signal can be received with a second RF receiver. At step 414, a quantity of shopping carts that are disposed within the retail environment can be estimated based on the at least one property of the second reflected RF signal received by the second RF receiver. At step 416, the customer count within the retail environment can be estimated based on the estimated quantity of shopping carts that are disposed in the interior area of the enclosure and the retail environment. Data associated with the customer count can be stored in a database, and can be analyzed to forecast customer peak times such that the proper number of employees are scheduled during the peak customer times.

Figure 20:
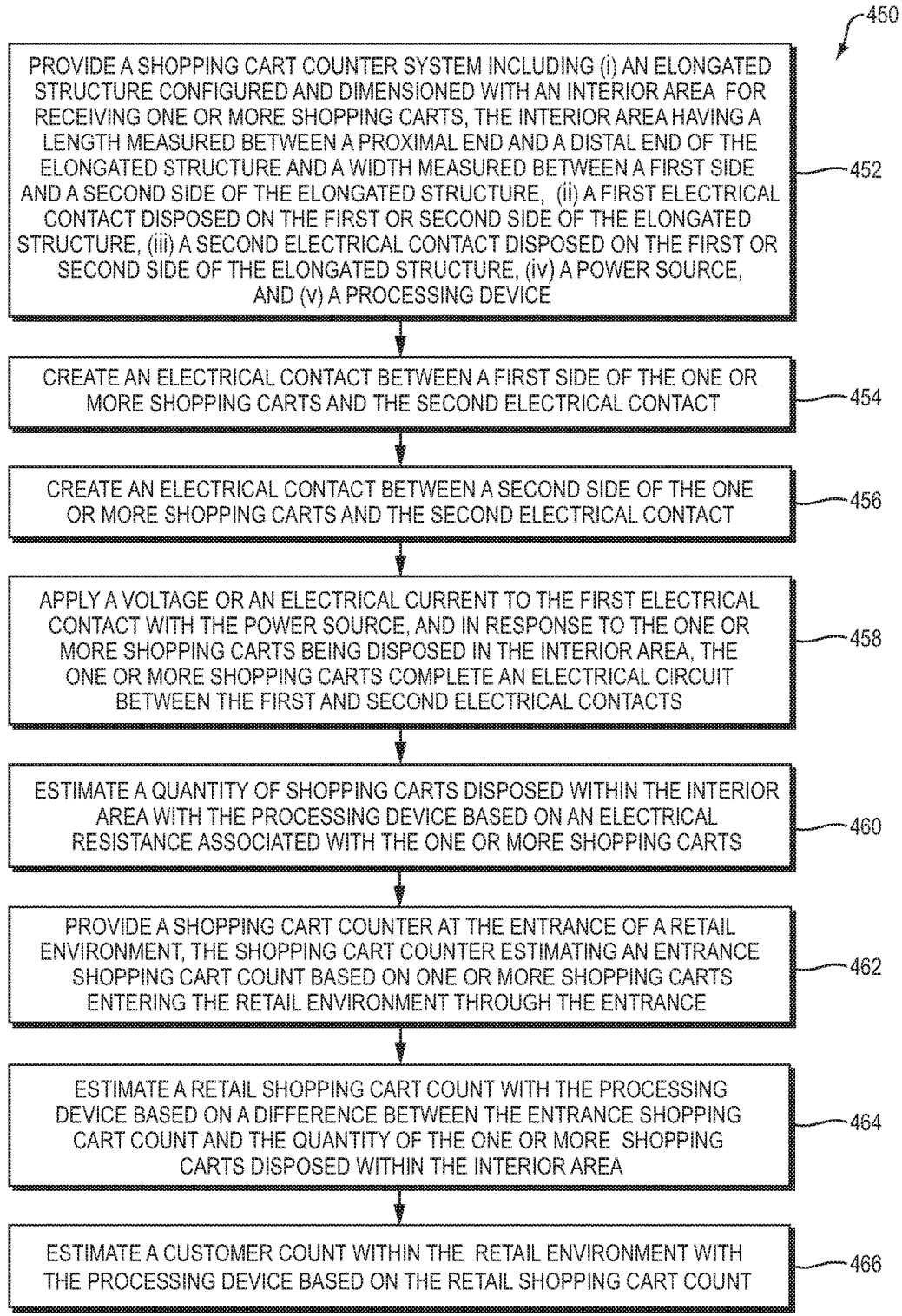
FIG. 20 is a flowchart illustrating an implementation of an exemplary customer count estimation system of the present disclosure.

FIG. 20 is a flowchart illustrating an exemplary process 450 as implemented by a customer count estimation system disclosed herein. To begin, at step 452, a shopping cart counter system can be provided that includes an elongated structure, a first electrical contact, a second electrical contact, a power source, and a processing device. At step 454, an electrical contact can be created between a first side of the one or more shopping carts and the first electrical contact. At step 456, an electrical contact can be created between a second side of the one or more shopping carts and the second electrical contact. At step 458, a voltage or electrical current can be applied to the first electrical contact with the power source. In response to the one or more shopping carts being disposed in the interior area of the elongated structure, the one or more shopping carts can complete an electrical circuit between the first and second electrical contacts.

At step 460, a quantity of the one or more shopping carts disposed within the interior area can be estimated with the processing device based on an electrical resistance associated with the one or more shopping carts. At step 462, a shopping cart counter can be provided at an entrance of a retail environment. The shopping cart counter can estimate an entrance shopping cart count based on the one or more shopping carts entering (and leaving) the retail environment through the entrance. At step 464, a retail shopping cart count can be estimated with the processing device based on a difference between the entrance shopping cart count and the quantity of the one or more shopping carts disposed within the interior area. At step 466, a customer count within the retail environment can be estimated with the processing device based on the retail shopping cart count. Data associated with the customer count can be stored in a database, and can be analyzed to forecast customer peak times such that the proper number of employees are scheduled during the peak customer times.

Figure 21:
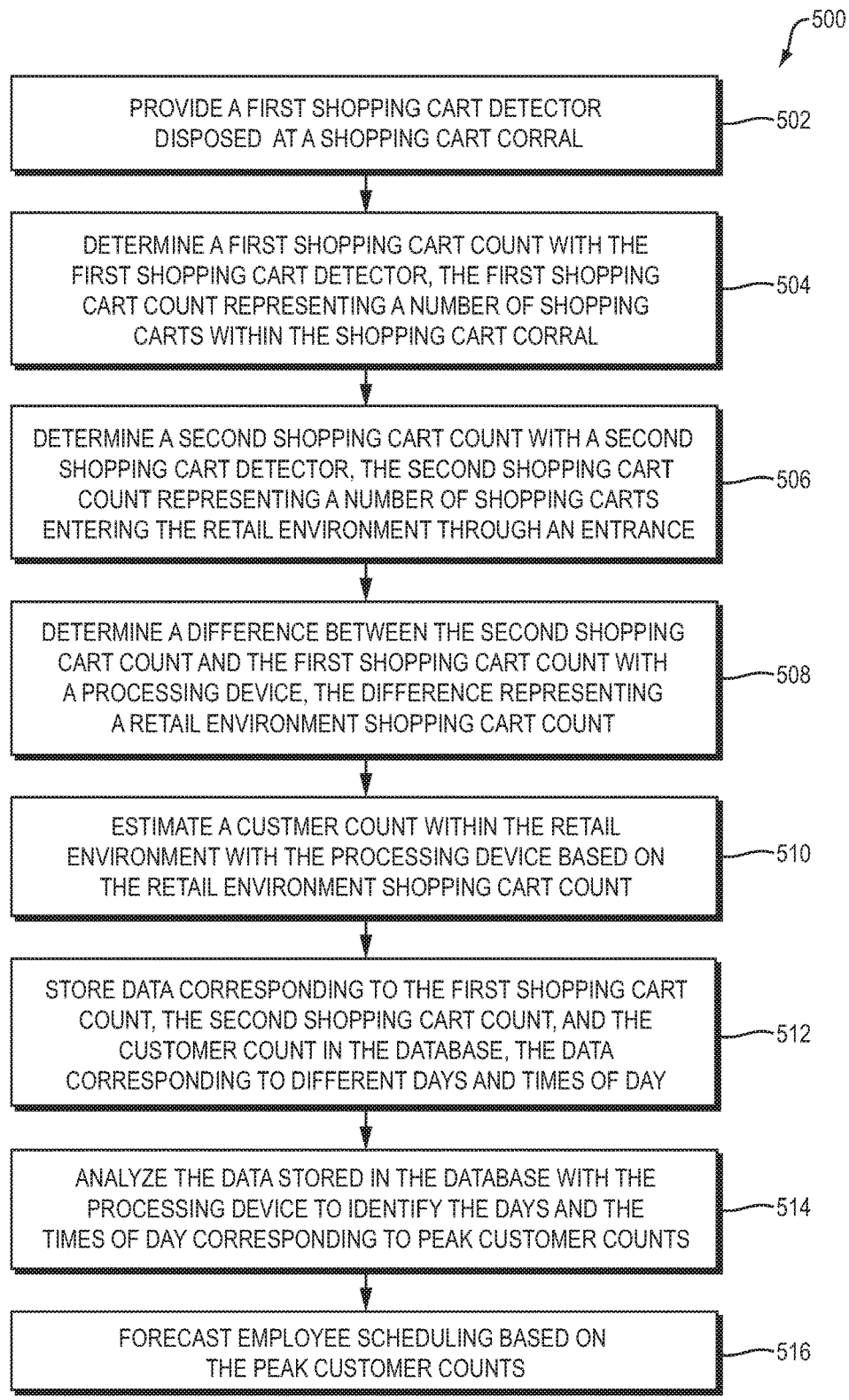
FIG. 21 is a flowchart illustrating an implementation of an exemplary retail environment employee scheduling system.

FIG. 21 is a flowchart illustrating an exemplary process 500 as implemented by a retail environment employee scheduling system disclosed herein. To begin, at step 502, a first shopping cart detector disposed at a shopping cart corral can be provided. At step 504, a first shopping cart count can be determined with the first shopping cart detector. The first shopping cart count can represent a number of shopping carts within the shopping cart corral. At step 506, a second shopping cart count can be determined with a second shopping cart detector. The second shopping cart count can represent a number of shopping carts entering the retail environment through an entrance. At step 508, a difference between the second shopping cart count and the first shopping cart count can be determined with a processing device. The difference can represent a retail environment shopping cart count.

At step 510, a customer count within the retail environment can be estimated with the processing device based on the retail environment cart count. At step 512, data corresponding to the first shopping cart count, the second shopping cart count, and the customer count can be stored in a database. The data can correspond to different days and times of day. At step 514, the data stored in the database can be analyzed with the processing device to identify the days and times of day corresponding to peak customer counts. At step 516, employee scheduling can be forecast based on the peak customer counts. Thus, the retail environment can be properly staffed to meet the needs of customers during various days and times of day.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A shopping cart corral system, comprising:
a corral structure including a proximal end, a distal end, and an enclosure configured and dimensioned to extend between the proximal and distal ends, the enclosure defining an interior area for receiving one or more shopping carts, the proximal end of the corral structure including an opening for entrance and exit of the one or more shopping carts from the enclosure;
a radio-frequency transmitter to transmit a radio-frequency signal into the interior area of the enclosure, the radio-frequency signal interacting with the one or more shopping carts in the corral structure to generate a reflected radio-frequency signal having at least one property that differs from the radio-frequency signal based on interference of the one or more shopping carts with the radio-frequency signal;
a radio-frequency receiver being configured to receive the reflected radio-frequency signal; and
a controller operatively coupled to the radio-frequency receiver, the controller being configured to estimate a quantity of shopping carts that are disposed in the interior area of the enclosure based on the at least one property of the reflected radio-frequency signal received by the radio-frequency receiver, a degree to which the one or more shopping carts interfere with the radio-frequency signal indicative of the quantity of shopping carts that are disposed in the interior area of the enclosure.

2. The shopping cart corral of claim 1, wherein the radio-frequency transmitter is disposed at the distal end of the corral structure.

3. The shopping cart corral of claim 2, wherein the radio-frequency transmitter transmits the radio-frequency signal from the distal end towards the proximal end of the corral structure.

4. The shopping cart corral of claim 1, wherein the radio-frequency transmitter transmits a plurality of radio-frequency signals into the interior area of the enclosure and the radio-frequency receiver receives a plurality of reflected radio-frequency signals.

5. The shopping cart corral of claim 1, wherein the reflected radio-frequency signal is a radiated wave reflection.

6. The shopping cart corral of claim 1, wherein the degree to which the one or more shopping carts interfere with the radio-frequency signal increases as a number of shopping carts disposed within the interior area of the enclosure increases.

7. The shopping cart corral of claim 6, wherein the controller is configured to determine that zero shopping carts are in the interior area of the enclosure of the corral structure in response to a first value of the at least one property of the reflected radio-frequency signal.

8. The shopping cart corral of claim 6, wherein the controller is configured to determine that half of the interior area of the enclosure of the corral structure is filled with the one or more shopping carts in response to a second value of the at least one property of the reflected radio-frequency signal.

9. The shopping cart corral of claim 6, wherein the controller is configured to determine that three-quarters of the interior area of the enclosure of the corral structure is filled with the one or more shopping carts based on a third value of the at least one property of the reflected radio-frequency signal.

10. A method of estimating a customer count, comprising:
providing a shopping cart corral system, the shopping cart corral system including (i) a corral structure including a proximal end, a distal end and an enclosure configured and dimensioned to extend between the proximal and distal ends, the enclosure defining an interior area for receiving one or more shopping carts, the proximal end of the corral structure including an opening for entrance and exit of the one or more shopping carts from the enclosure, (ii) a radio-frequency transmitter, (iii) a radio-frequency receiver, and (iv) a controller operatively coupled to the radio-frequency receiver;
transmitting a radio-frequency signal with the radio-frequency transmitter into the interior area of the enclosure, the radio-frequency signal interacting with the one or more shopping carts in the corral structure to generate a reflected radio-frequency signal having at least one property that differs from the radio-frequency signal based on interference of the one or more shopping carts with the radio-frequency signal;
receiving the reflected radio-frequency signal with the radio-frequency receiver; and
estimating a quantity of shopping carts that are disposed in the interior area of the enclosure with the controller based on the at least one property of the reflected radio-frequency signal received by the radio-frequency receiver, a degree to which the one or more shopping carts interfere with the radio-frequency signal indicative of the quantity of shopping carts that are disposed in the interior area of the enclosure.

11. The method of claim 10, comprising estimating a customer count using a shopping cart within a retail environment based on the estimated quantity of shopping carts that are disposed in the interior area of the enclosure.

12. The method of claim 10, comprising transmitting the radio-frequency signal with the radio-frequency transmitter from the distal end towards the proximal end of the corral structure.

13. A customer count estimation system, comprising:
a corral structure including a proximal end, a distal end, and an enclosure configured and dimensioned to extend between the proximal and distal ends, the enclosure defining an interior area for receiving one or more shopping carts, the proximal end of the corral structure including an opening for entrance and exit of the one or more shopping carts from the enclosure;
a first radio-frequency transmitter to transmit a first radio-frequency signal into the interior area of the enclosure, the first radio-frequency signal interacting with the one or more shopping carts in the corral structure to generate a first reflected radio-frequency signal having at least one property that differs from the first radio-frequency signal based on interference of the one or more shopping carts with the first radio-frequency signal;
a first radio-frequency receiver being configured to receive the first reflected radio-frequency signal;
a second radio-frequency transmitter disposed at an entrance of a retail environment to transmit a second radio-frequency signal into the entrance of the retail environment, the second radio-frequency signal interacting with one or more shopping carts passing through the entrance of the retail environment to generate a second reflected radio-frequency signal having at least one property that differs from the second radio-frequency signal;
a second radio-frequency receiver being configured to receive the second reflected radio-frequency signal; and
a controller operatively coupled to the first radio-frequency receiver and the second radio-frequency receiver, the controller being configured to (i) estimate a quantity of shopping carts that are disposed in the interior area of the enclosure based on the at least one property of the reflected first radio-frequency signal received by the first radio-frequency receiver, a degree to which the one or more shopping carts interfere with the first radio-frequency signal indicative of the quantity of shopping carts that are disposed in the interior area of the enclosure, (ii) estimate a quantity of shopping carts that are disposed within the retail environment based on the at least one property of the reflected second radio-frequency signal received by the second radio-frequency receiver, and (iii) estimate a customer count using a shopping cart within the retail environment based on the quantity of shopping carts that are disposed in the interior area of the enclosure and the quantity of shopping carts that are disposed within the retail environment.

14. The system of claim 13, wherein the radio-frequency transmitter is disposed at the distal end of the corral structure.

15. The system of claim 14, wherein the first radio-frequency transmitter transmits the first radio-frequency signal from the distal end towards the proximal end of the corral structure.

16. The system of claim 13, wherein the second radio-frequency transmitter transmits the second radio-frequency signal across the entrance of the retail environment.

17. The system of claim 13, wherein the first and second reflected radio-frequency signals are a radiated wave reflection.

18. The system of claim 13, wherein the degree to which the one or more shopping carts interfere with the first radio-frequency signal increases as a number of shopping carts disposed within the interior area of the enclosure increases.

19. The shopping cart corral of claim 1, wherein the at least one property includes at least one of a power, an amplitude, a phase, a frequency, or a polarization that the reflected radio-frequency signal that differs from the radio-frequency signal due to interference of the one or more shopping carts with the radio-frequency signal.

20. The shopping cart corral of claim 1, wherein the interference of the one or more shopping carts with the radio-frequency signal includes at least one of reflection, refraction, diffraction, or absorption of the radio-frequency signal by the one or more shopping carts disposed in the interior area of the enclosure.

* * * * *